(12) United States Patent
Fujioka

(10) Patent No.: US 12,701,621 B2
(45) Date of Patent: Aug. 4, 2026

(54) COMMUNICATION DEVICE AND CONTROL METHOD THEREOF

(71) Applicant: Canon Kabushiki Kaisha, Tokyo (JP)

(72) Inventor: Masaki Fujioka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 18/461,594

(22) Filed: Sep. 6, 2023

(65) Prior Publication Data

US 2024/0114571 A1    Apr. 4, 2024

(30) Foreign Application Priority Data

Sep. 29, 2022    (JP) ................................. 2022-156468

(51) Int. Cl.
| | |
|---|---|
| *H04W 76/15* | (2018.01) |
| *H04W 72/40* | (2023.01) |
| *H04W 72/51* | (2023.01) |
| *H04W 76/14* | (2018.01) |

(52) U.S. Cl.
CPC ........... *H04W 76/15* (2018.02); *H04W 72/40* (2023.01); *H04W 72/51* (2023.01); *H04W 76/14* (2018.02)

(58) Field of Classification Search
CPC ..... H04W 76/15; H04W 76/14; H04W 72/51; H04W 72/40
See application file for complete search history.

(56) References Cited

U.S. PATENT DOCUMENTS

| | | | | |
|---|---|---|---|---|
| 2003/0002473 | A1* | 1/2003 | Goodings | H04M 1/725 |
| | | | | 370/349 |
| 2008/0144601 | A1* | 6/2008 | Nurminen | H04L 67/04 |
| | | | | 370/350 |
| 2015/0312703 | A1* | 10/2015 | Maldari | H04W 8/005 |
| | | | | 455/41.2 |
| 2018/0132088 | A1* | 5/2018 | Lee | H04W 4/80 |
| 2019/0191074 | A1 | 6/2019 | Ikeda | |
| 2022/0039179 | A1* | 2/2022 | Chen | H04R 1/1016 |
| 2024/0098601 | A1* | 3/2024 | Moyal | H04W 36/30 |
| 2024/0146996 | A1* | 5/2024 | Shao | H04N 21/4221 |

FOREIGN PATENT DOCUMENTS

| | | |
|---|---|---|
| JP | 2020-123841 A | 8/2020 |

OTHER PUBLICATIONS

Combined Search and Examination Report issued Jan. 30, 2024 in counterpart GB Patent Appln. No. 1 GB2313491.9.
British Office Action dated Apr. 14, 2026 in counterpart British Patent Appln. No. GB2313491.9.

* cited by examiner

*Primary Examiner* — Benjamin H Elliott, IV
*Assistant Examiner* — Tracy Lauren Raimondo
(74) *Attorney, Agent, or Firm* — Venable LLP

(57) ABSTRACT
A communication device that communicates with an external device using a first connection method and a second connection method is disclosed. The communication device, when a connection is established with an external device, determines whether to automatically display a screen for using the external device from the communication device on a display device, based on (i) a connection method used to connect to the external device and/or (ii) whether the external device is newly connected or reconnected.

11 Claims, 14 Drawing Sheets

F I G. 1
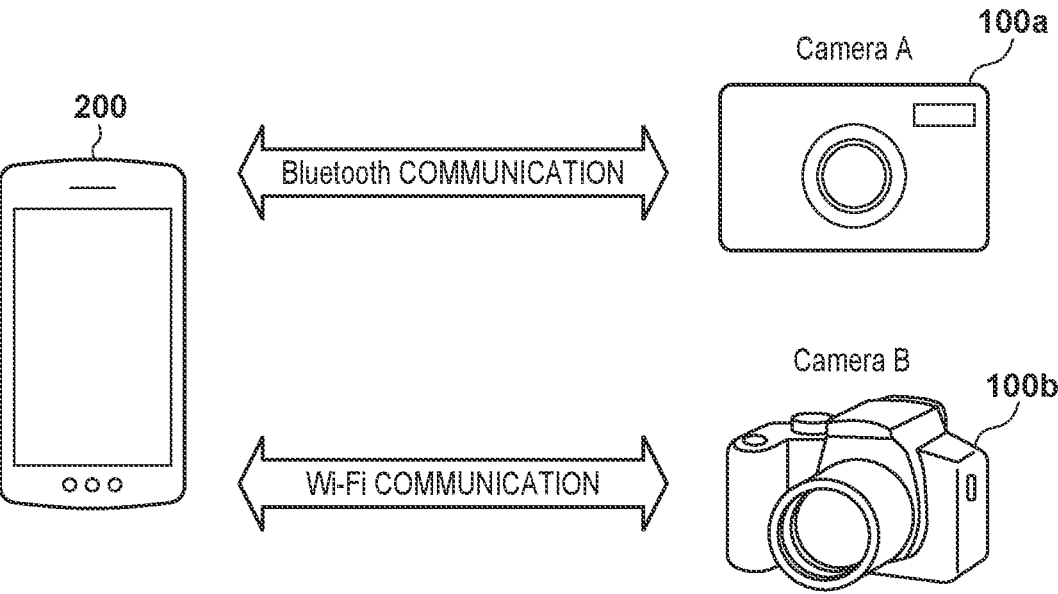

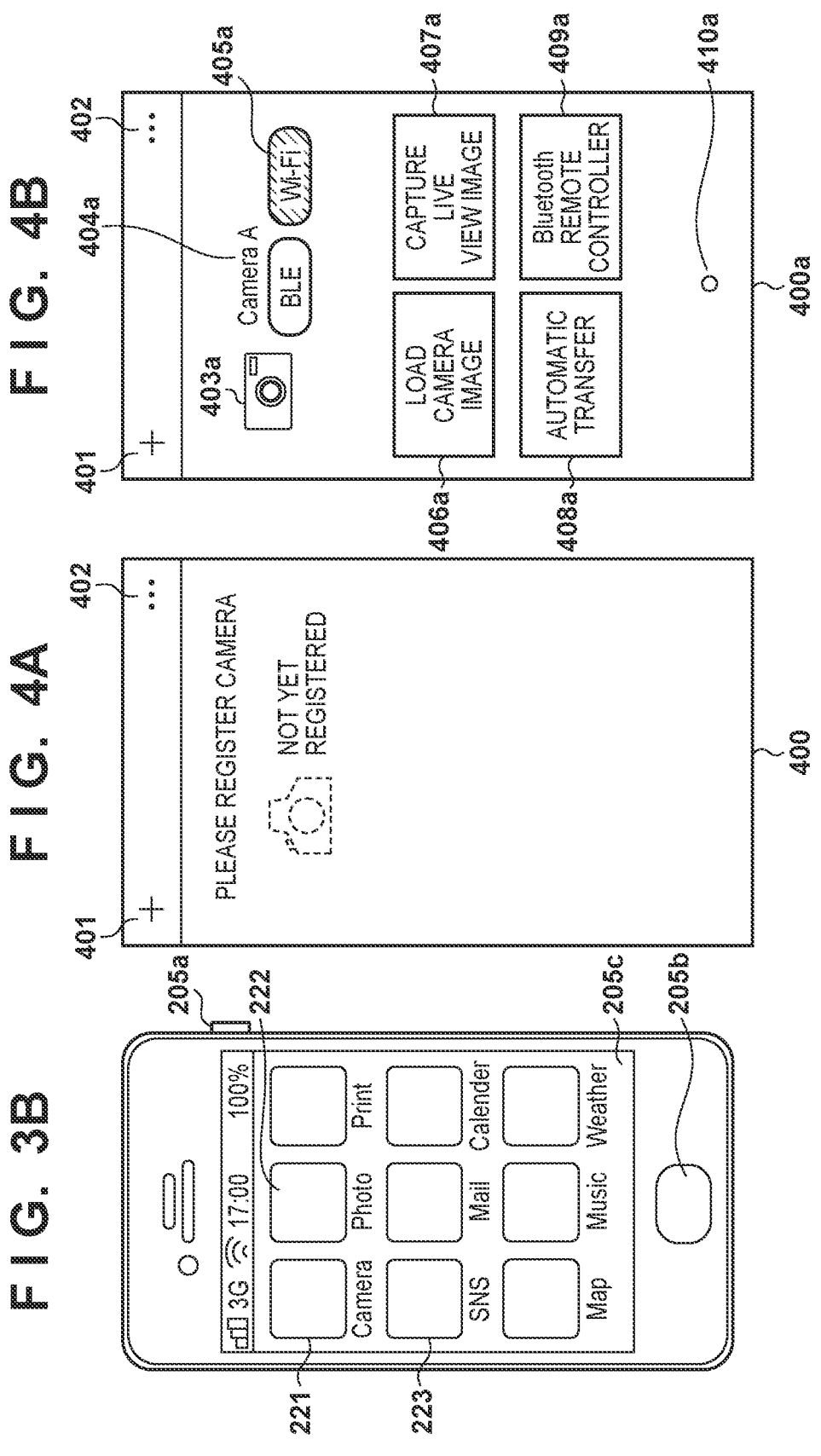

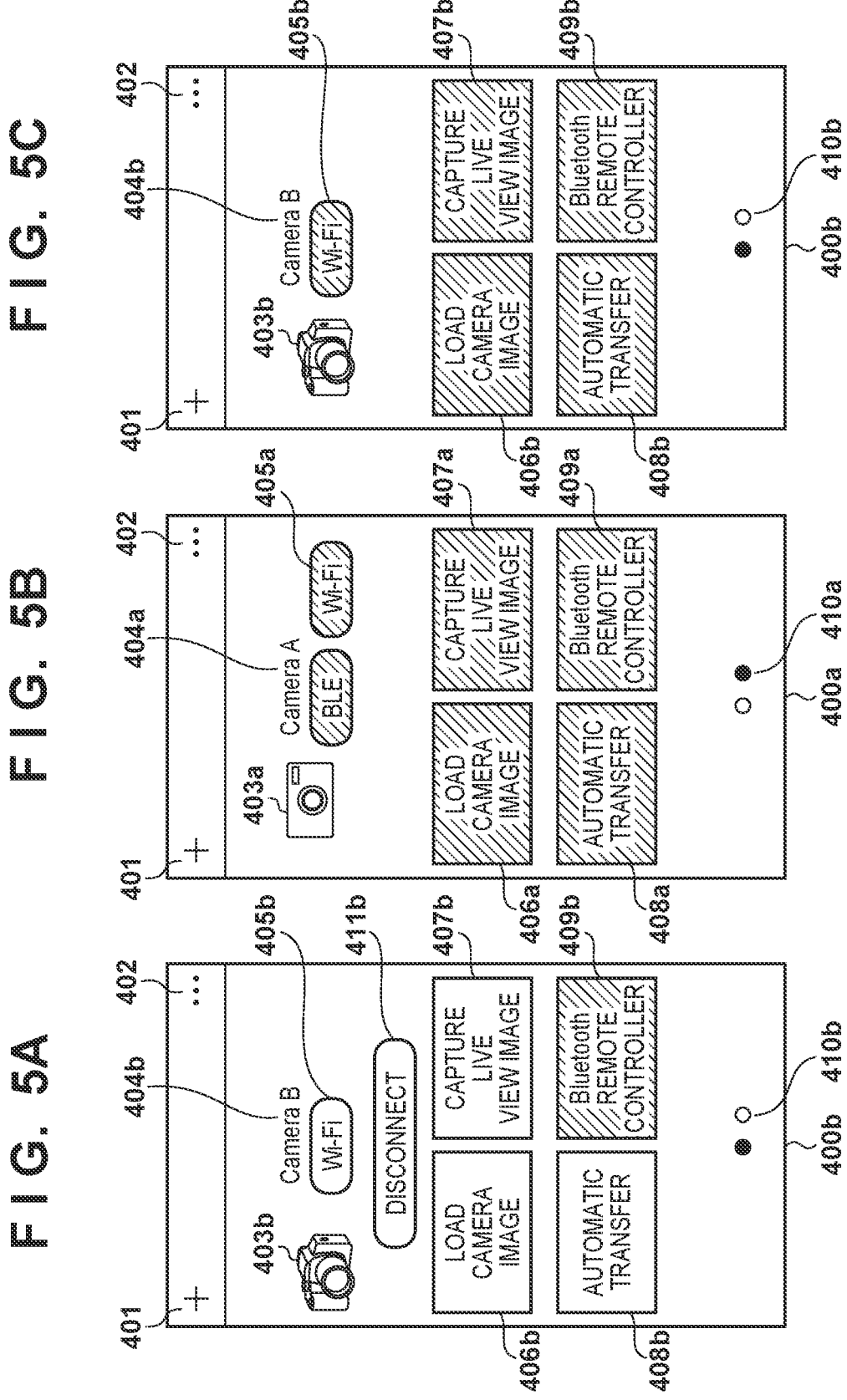
F I G. 5A     F I G. 5B     F I G. 5C

F I G. 6

| INDEX | NAME | IDENTIFICATION INFORMATION |
|---|---|---|
| 1 | Camera A | 11-22-33-44-55-66 |
| 2 | Camera B | 77-88-99-00-11-22 |
| 3 | Camera C | 12-34-56-78-90-12 |

501    502    503

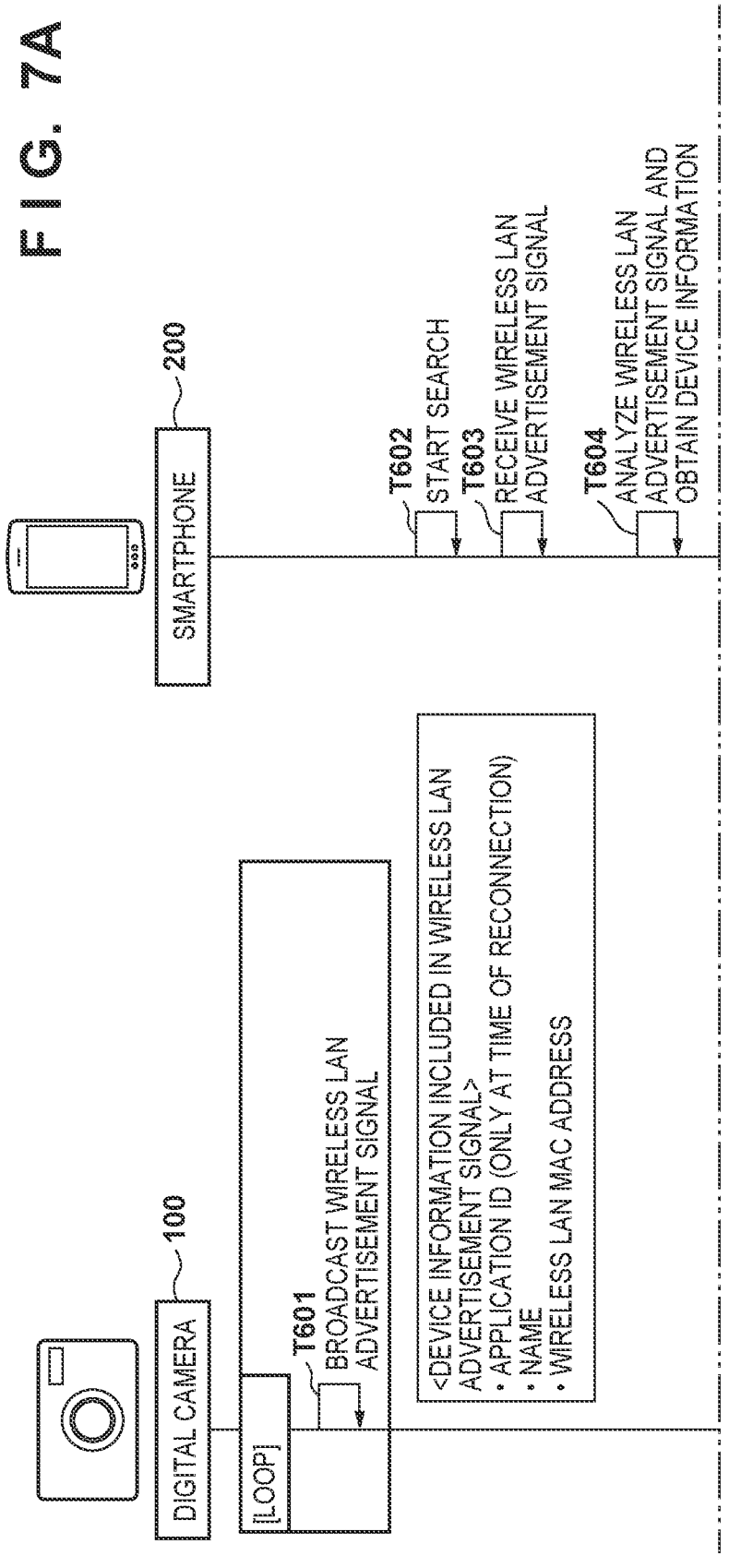
F I G. 7A

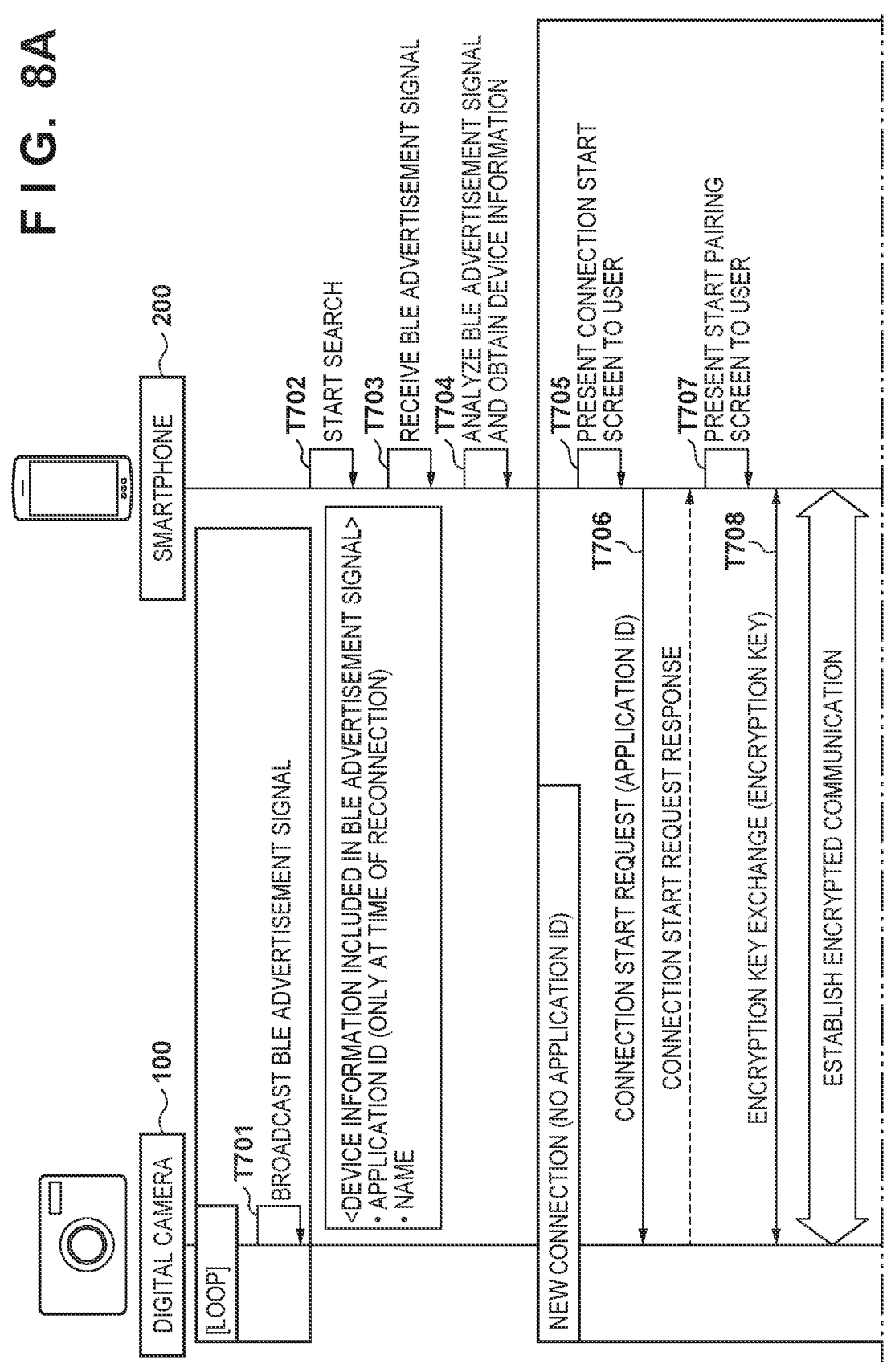
F I G. 8A

F I G.  8B
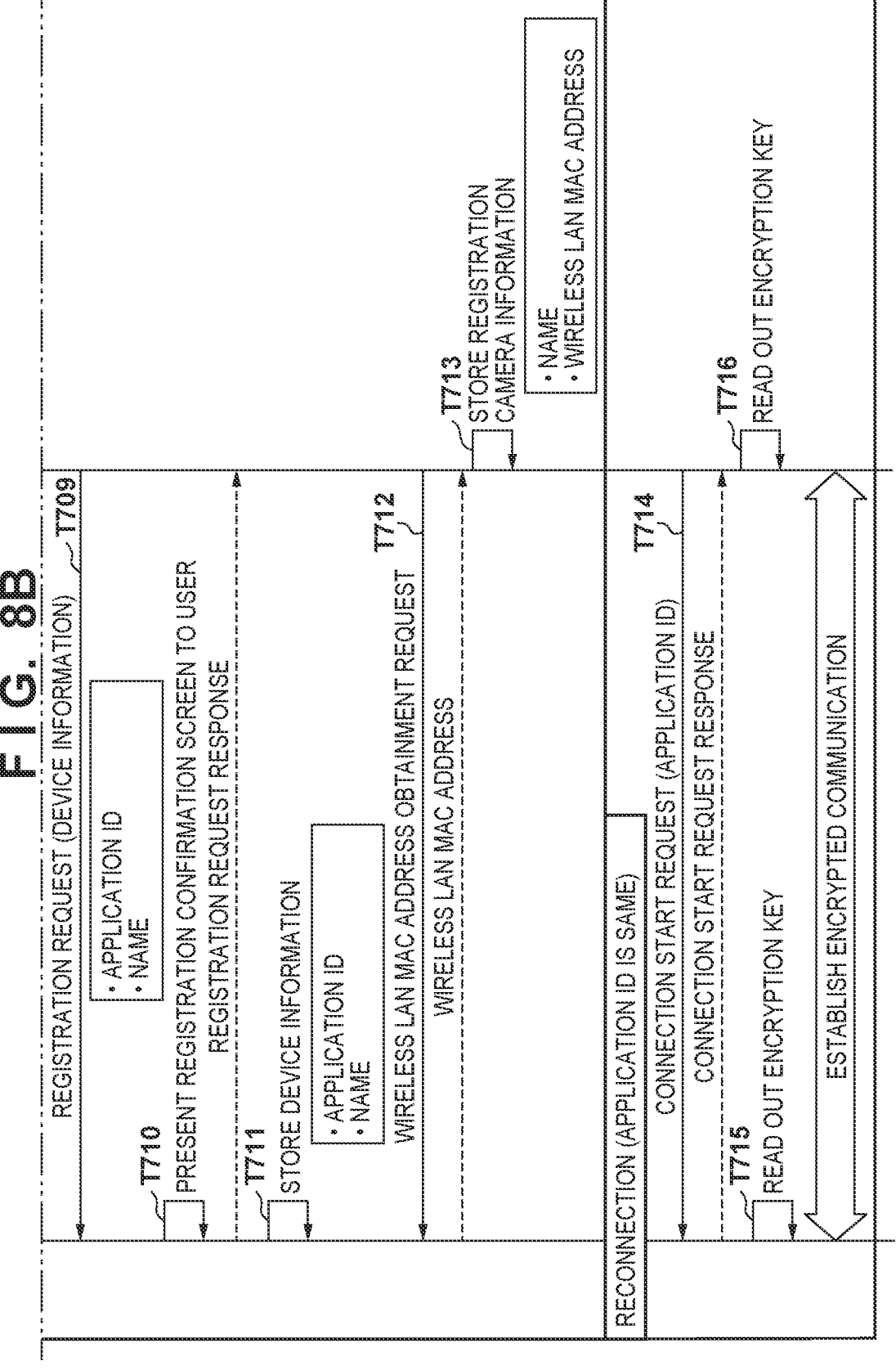

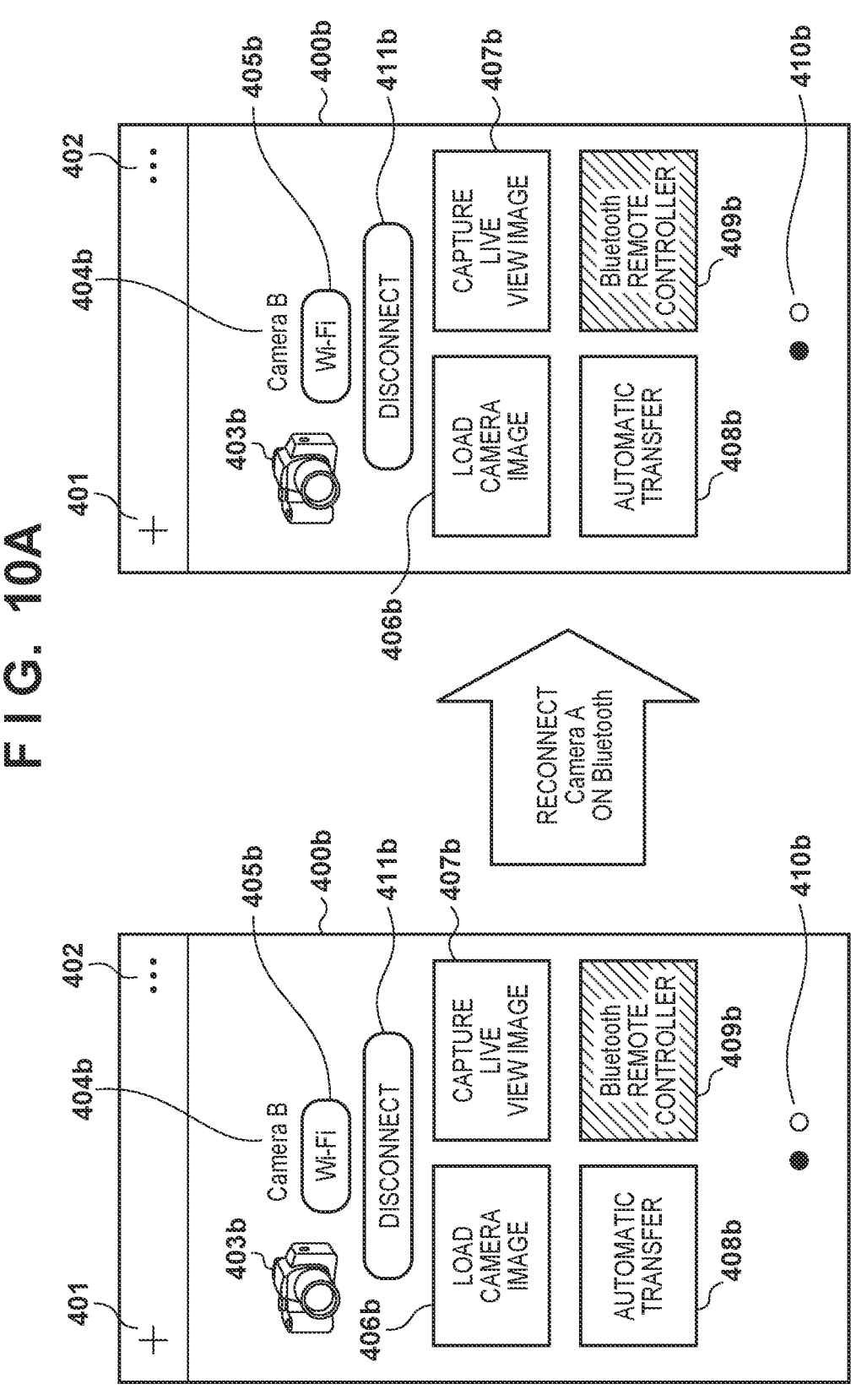
F I G. 10A

F I G. 10B

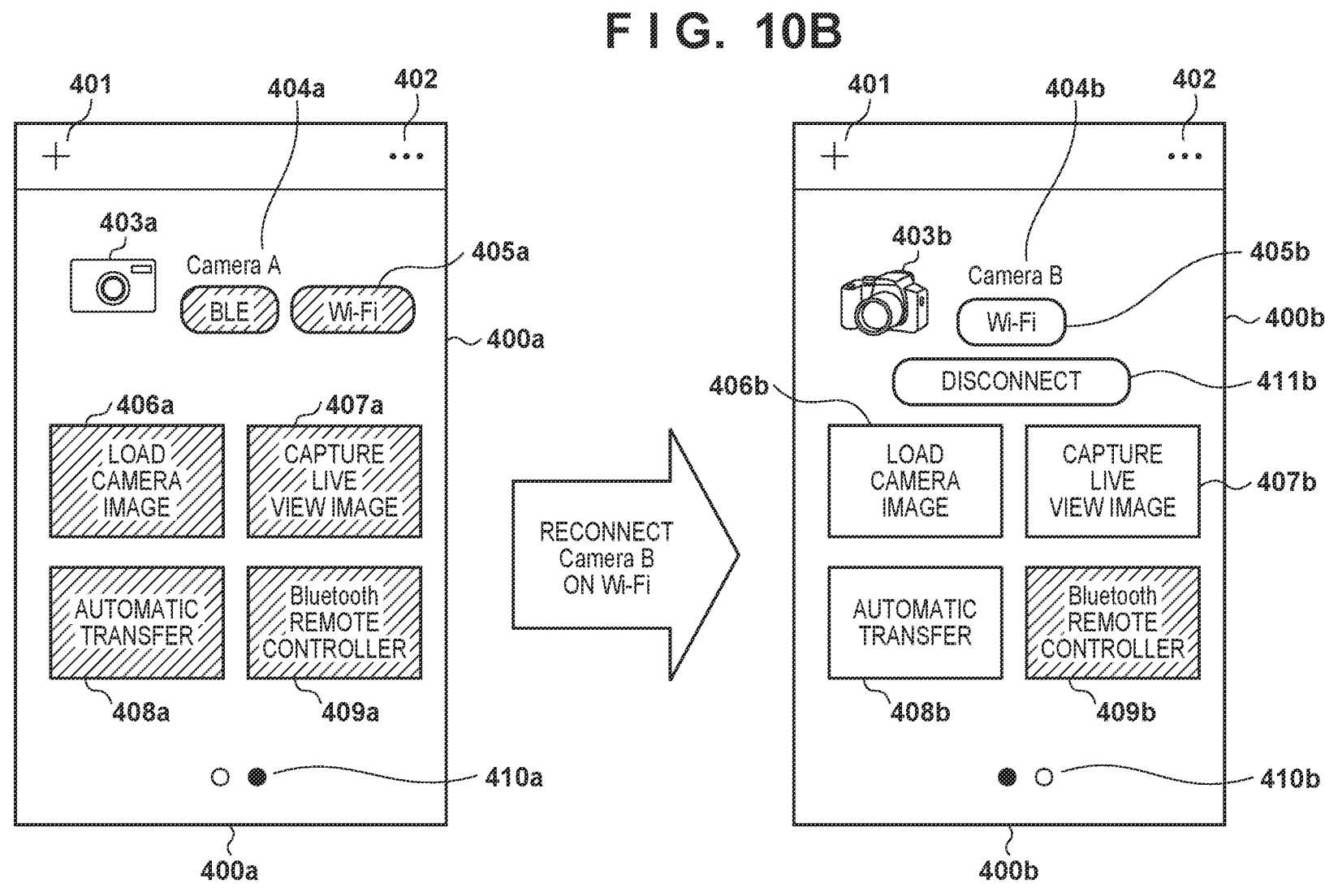

400a

401 — +

402 — • • •

403a

Camera A

404a — BLE

405a — Wi-Fi

406a — LOAD CAMERA IMAGE

407a — CAPTURE LIVE VIEW IMAGE

408a — AUTOMATIC TRANSFER

409a — Bluetooth REMOTE CONTROLLER

410a — ● ○

400a

RECONNECT Camera B ON Wi-Fi

400b

401 — +

402 — • • •

403b

Camera B

404b — Wi-Fi

405b — 400b

411b — DISCONNECT

406b — LOAD CAMERA IMAGE

407b — CAPTURE LIVE VIEW IMAGE

408b — AUTOMATIC TRANSFER

409b — Bluetooth REMOTE CONTROLLER

410b — ● ○

400b

F I G. 11

| | RECONNECTION | NEW CONNECTION |
|---|---|---|
| BLE | DO NOT SWITCH DISPLAY | SWITCH DISPLAY |
| WIRELESS LAN | SWITCH DISPLAY | SWITCH DISPLAY |
| USB | SWITCH DISPLAY | SWITCH DISPLAY |
| NFC | SWITCH DISPLAY | SWITCH DISPLAY |

COMMUNICATION DEVICE AND CONTROL METHOD THEREOF

BACKGROUND OF THE INVENTION

Field of the Invention

The present invention relates to a communication device and a control method thereof, and particularly relates to a communication device capable of communicating with a plurality of external devices, and to a control method thereof.

Description of the Related Art

When a plurality of external devices with which a device can communicate are present, it is necessary to determine with which external device operations are to be executed. Japanese Patent Laid-Open No. 2020-123841 discloses a communication device that, when a connection is established with one external device while a connection is already established with another external device, automatically switches the target of data communication to the external device with which the later connection was established.

However, with the method disclosed in Japanese Patent Laid-Open No. 2020-123841, if the external device with which the later connection was established is not a user's intended external device, the target of the data communication will switch to an external device not intended by the user.

SUMMARY OF THE INVENTION

The present invention in one aspect provides a communication device, and a control method thereof, which is capable of performing operations with an appropriate external device when establishing a connection with one external device while a connection is already established with another external device.

According to an aspect of the present invention, there is provided a communication device capable of communicating with an external device using a first connection method and a second connection method, the communication device comprising: a display device; and one or more processors that execute a program stored in a memory and thereby function as a control unit configured to determine, when a connection is established with an external device (e.g. using the first connection method and/or the second communication method), whether to automatically display a screen for using the external device from the communication device based on (i) a connection method used to connect to the external device (e.g. the first connection method and/or the second communication method) and/or (ii) whether the external device is newly connected or reconnected.

According to another aspect of the present invention, there is provided a control method for a communication device capable of communicating with an external device using a first connection method and a second connection method, the control method comprising: detecting that a connection has been established with an external device (e.g. using the first connection method and/or the second connection method); and determining whether to automatically display, in a display device, a screen for using the external device, for which a connection has been established, from the communication device, based on (i) a connection method used to connect to the external device (e.g. the first connection method and/or the second connection method) and/or (ii) whether the external device is newly connected or reconnected.

According to a further aspect of the present invention, there is provided a non-transitory computer-readable medium that stores a program which, when executed by a computer, causes the computer to perform a control method for a communication device capable of communicating with an external device using a first connection method and a second connection method, the control method comprising: detecting that a connection has been established with an external device; and determining whether to automatically display, in a display device, a screen for using the external device, for which a connection has been established, from the communication device, based on (i) a connection method used to connect to the external device and/or (ii) whether the external device is newly connected or reconnected.

Further features of the present invention will become apparent from the following description of exemplary embodiments (with reference to the attached drawings).

BRIEF DESCRIPTION OF THE DRAWINGS

FIG. 1 is a schematic diagram illustrating a communication system according to embodiments.

FIGS. 3A and 3B are block diagrams illustrating an example of the functional configuration of a smartphone serving as a communication device according to embodiments.

FIGS. 4A and 4B are diagrams illustrating examples of menu screens of a camera communication application according to embodiments.

FIGS. 5A to 5C are diagrams illustrating examples of a menu screen of the camera communication application according to embodiments.

FIG. 6 is a diagram illustrating an example of camera information registered in embodiments.

FIGS. 7A and 7B are sequence charts pertaining to wireless LAN connection operations between the digital camera and the smartphone according to embodiments.

FIGS. 8A and 8B are sequence charts pertaining to BLE connection operations between the digital camera and the smartphone according to embodiments.

FIGS. 10A and 10B are diagrams illustrating screen display control by the camera communication application according to embodiments.

FIG. 11 is a diagram illustrating screen display control for each of connection methods according to embodiments.

DESCRIPTION OF THE EMBODIMENTS

Figure 2:
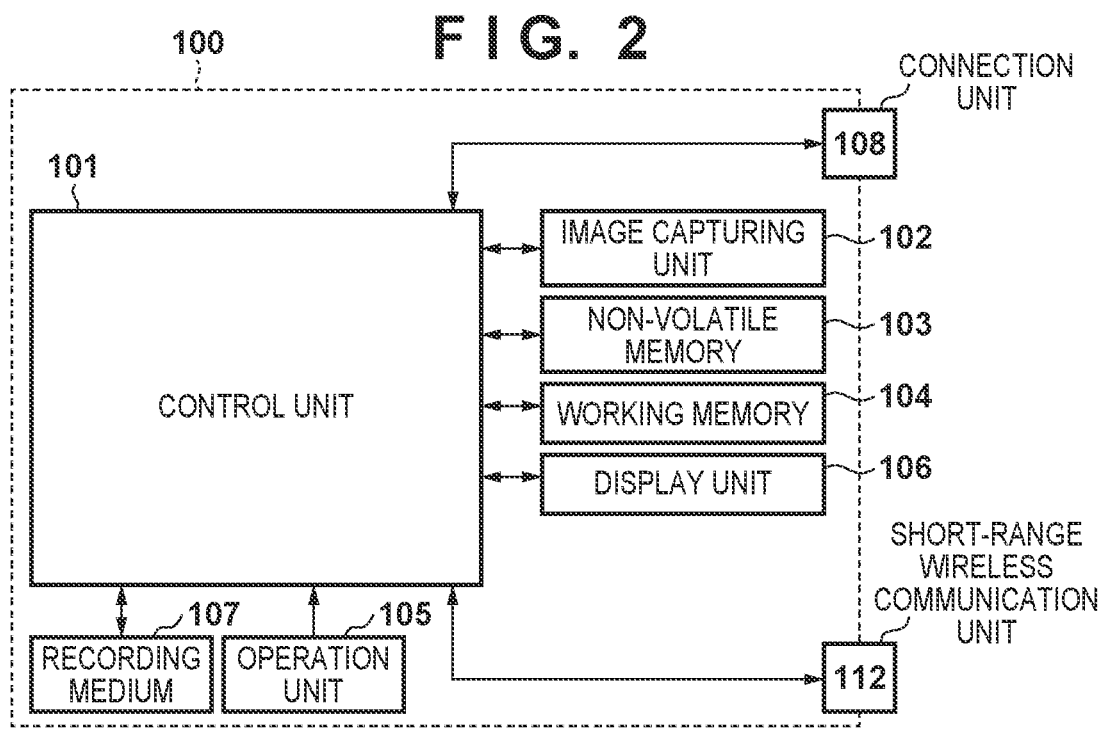
FIG. 2 is a block diagram illustrating an example of the functional configuration of a digital camera serving as an example of an external device according to embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The following embodiment will describe a case where the present invention is applied in the smartphone. However, the present invention can be applied in any electronic device capable of establishing connections with a plurality of external devices. Such an electronic device includes a computer device (a personal computer, a tablet computer, a media player, a PDA, or the like), a game console, an image capturing device, or the like. These are merely examples, however, and the present invention can be applied in other electronic devices as well.

System Configuration

FIG. 1 is a diagram schematically illustrating an example of the form of connections among a smartphone 200, which serves as an example of the communication device according to embodiments of the present invention, and digital cameras 100a and 100b, which serve as examples of the plurality of external devices. Note that the external devices are not required to have image capturing functions, and may be any electronic devices capable of communicating with the smartphone 200.

The smartphone 200 has a communication interface which conforms to the Bluetooth (registered trademark) standard, and a communication interface which conforms to the wireless LAN (Wi-Fi) standard. Note that the smartphone 200 may have other communication interfaces which conform to other wireless communication standards. The smartphone 200 may also have one or more wired communication interfaces.

FIG. 1 assumes that the smartphone 200 establishes a Bluetooth connection with the digital camera 100a and the wireless LAN (Wi-Fi) connection with the digital camera 100b. Note that the smartphone 200 may establish connections which conform to the same communication standard with both the digital cameras 100a and 100b. Such connections are possible using the Bluetooth standard, for example. On the other hand, a plurality of connections cannot be established in parallel with the wireless LAN standard.

Communication using the wireless LAN standard is assumed to be executed an infrastructure mode, with the digital cameras functioning as simple access points (APs). The configuration may be such that the smartphone 200 and the digital camera 100b connect to a common access point.

Although details will be given later, it is assumed that the digital camera 100a and the digital camera 100b are stored in the smartphone 200 as "Camera A" and "Camera B", respectively.

Example of Configurations of Digital Cameras

The configurations of the digital cameras 100a and 100b will be described next. The present specification assumes that the main functional configurations of the digital cameras 100a and 100b are the same. The digital cameras 100a and 100b are referred to collectively as a "digital camera 100". Accordingly, a description that refers to the "digital camera 100" applies to both the digital cameras 100a and 100b.

FIG. 2 is a block diagram illustrating an example of the functional configuration of the digital camera 100.

A control unit 101 includes one or more processors ("CPUs" hereinafter) capable of executing programs, and loads program stored in, for example, a non-volatile memory 103 into a working memory 104 and executes the programs. The control unit 101 realizes the functions of the digital camera 100 by executing programs to control the operations of the various function blocks.

The non-volatile memory 103, which may be rewritable, stores programs which can be executed by the CPU of the control unit 101, setting values for the digital camera 100, GUI data, and the like. The non-volatile memory 103 also stores information pertaining to external devices which have been communicated with.

Note that the operations of the digital camera 100 (described later) are assumed to be realized by executing programs stored in the non-volatile memory 103.

The working memory 104 is, for example, volatile memory, and is used to load programs to be executed by the CPU of the control unit 101, store values needed during the execution of the programs, and the like. Note that part of the working memory 104 may be used as display memory for a display unit 106.

An image capturing unit 102 is a camera unit having an imaging optical system, an image sensor, and the like. The image capturing unit 102 captures images under the control of the control unit 101, and stores the resulting image data in the working memory 104. The control unit 101 generates an image data file by applying predetermined image processing to the image data. The control unit 101 records the image data file into a recording medium 107, for example. The control unit 101 also generates image data for display by applying predetermined image processing to the image data. The control unit 101 stores the image data for display in a video memory region of the working memory 104, composites that data with an image indicating information such as the current setting values, and displays the result in the display unit 106.

The display unit 106 can be caused to function as an electronic viewfinder (EVF) by shooting a moving image using the image capturing unit 102 and immediately displaying the shot moving image in the display unit 106. The moving image displayed when the display unit 106 is caused to function as an EVF is called a "live view image".

"Operation unit 105" is a collective name for input devices provided in the digital camera 100. The operation unit 105 can include a touch panel provided on the display unit 106, a power switch, a shutter button, a moving image shooting button, a directional key, a set button, a menu button, and the like, but is not limited thereto. Upon detecting an operation made on the operation unit 105, the control unit 101 executes operations according to the detected operation.

The display unit 106 is used to display images shot by the image capturing unit 102, images recorded in the recording medium 107, menu screens, and the like. Note that the configuration may be such that an external display device can be connected to the digital camera 100.

The recording medium 107 is provided separate from the non-volatile memory 103, and may be a semiconductor memory card, for example. The recording medium 107 is used as a recording location for the image data files generated by the control unit 101, for example.

A connection unit 108 is a communication interface. The connection unit 108 communicates with an external device through communication conforming to at least one of publicly-known wired and wireless communication standards, including a wireless communication standard. The connection unit 108 includes circuitry (antennas, connectors, transmitters/receivers, and the like) according to the communication standard to which the unit conforms.

A short-range wireless communication unit 112 is another communication interface. The short-range wireless communication unit 112 communicates with external devices through communication conforming to one or more publicly-known short-range wireless communication standards. The short-range wireless communication unit 112 includes circuitry (antennas, transmitters/receivers, and the like) according to the communication standard to which the unit conforms.

For the sake of convenience, it is assumed here that the connection unit 108 and the short-range wireless communication unit 112 conform to mutually-different wireless communication standards. It is furthermore assumed that the connection unit 108 conforms to a communication standard providing a broader communication range and a faster communication speed than that of the short-range wireless communication unit 112, and requires a greater amount of power for operations than the short-range wireless communication unit 112. The combination of communication standards to which the connection unit 108 and the short-range wireless communication unit 112 conform is not particularly limited as long as the aforementioned relationship is satisfied.

In the present embodiment, the digital camera 100 communicates with a connection unit 208 and a short-range wireless communication unit 212 of the smartphone 200 (described later). It is therefore assumed that the connection units 108 and 208 conform to the same communication standard, and that the short-range wireless communication units 112 and 212 conform to the same communication standard.

The following will assume, as an example, that the connection units 108 and 208 are wireless communication interfaces which conform to the wireless LAN (IEEE 802.11 series) standard. It is also assumed that the short-range wireless communication units 112 and 212 are wireless communication interfaces which conform to a Bluetooth (registered trademark) version 4.0 or later standard, and Bluetooth Low Energy (BLE) in particular.

Note that the connection unit 108 and the short-range wireless communication unit 112 may share some circuitry.

Additionally, the connection unit 108 communicates with the connection unit 208 in infrastructure mode, and therefore functions as an access point (AP). In other words, the connection unit 108 has a function for forming a network to which the smartphone 200 can connect. However, it is assumed that the connection unit 108 functions as a simple AP which does not have a gateway function for transferring data received from an external device connected to the network the connection unit 108 itself formed to another network.

Example of Configuration of Smartphone

Figure 3A:
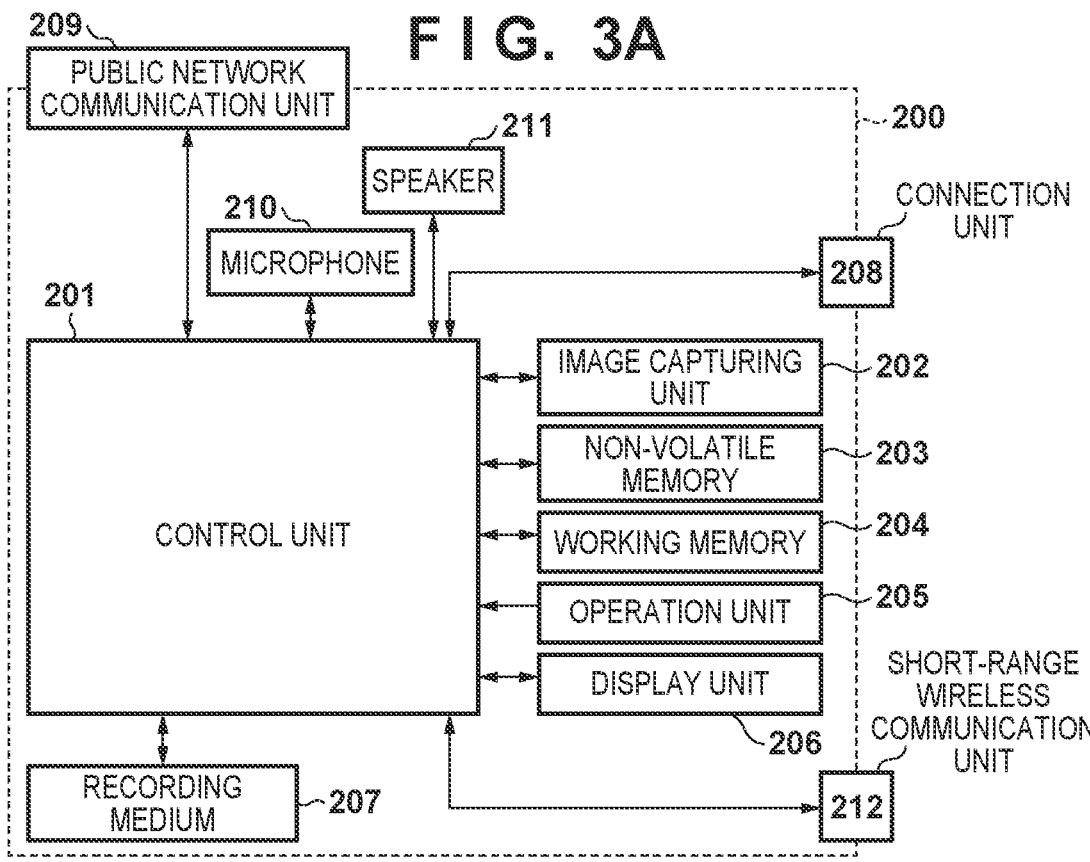

FIG. 3A is a block diagram illustrating an example of the functional configuration of the smartphone 200 serving as an example of a communication device according to the embodiment. The smartphone 200 may be any electronic device capable of communicating with the connection unit 108 and the short-range wireless communication unit 112 of the digital camera 100, which serves as an external device.

A control unit 201 includes one or more processors ("CPUs" hereinafter) capable of executing programs, and loads program stored in, for example, a non-volatile memory 203 into a working memory 204 and executes the programs. The control unit 201 implements the functions of the smartphone 200 by executing programs to control the operations of the function blocks.

The non-volatile memory 203, which may be rewritable, stores programs (basic software (an OS), applications, and the like) but can be executed by the CPU of the control unit 201, setting values for the smartphone 200 and the applications, user data, and the like. Additionally, as will be described later, the smartphone 200 stores information pertaining to external devices communicated with and information necessary for restarting communication with external devices communicated with in the non-volatile memory 203.

It is assumed that the operations of the smartphone 200 (described later) are realized by executing applications stored in the non-volatile memory 203. Note that it is not necessary for an application to include programs for realizing all the functions thereof, and functions provided by the OS can be used as appropriate. For example, the OS can provide basic functions pertaining to wireless communication with external devices which conform to specific wireless communication standards, such as confirming the presence/absence of external devices, establishing and terminating wireless connections (links) with external devices, and the like.

The working memory 204 is, for example, volatile memory, and is used to load programs to be executed by the CPU of the control unit 201, store values needed during the execution of the programs, and the like. Note that part of the working memory 204 may be used as display memory for a display unit 206.

An image capturing unit 202 is a camera unit having an imaging optical system, an image sensor, and the like. The image capturing unit 202 captures images under the control of the control unit 201, and stores the resulting image data in the working memory 204. The control unit 201 generates an image data file by applying predetermined image processing to the image data. The control unit 201 records the image data file into a recording medium 207, for example.

"Operation unit 205" is a collective name for input devices provided in the smartphone 200. The operation unit 205 can include a touch panel provided on the display unit 206, a power switch, volume adjustment buttons, and the like, but is not limited thereto. Upon detecting an operation made on the operation unit 205, the control unit 201 executes operations according to the detected operation.

The display unit 206 is a touchscreen. The display unit 206 displays screens provided by the OS, applications, and the like. The configuration may be such that an external display device can be connected to the smartphone 200.

The recording medium 207 is provided separate from the non-volatile memory 203, and may be a semiconductor memory card, for example. The recording medium 207 is used as a recording location for image data files generated by the control unit 201, data downloaded by a user, and the like, for example. Note that the recording medium 207 may be used as part of the non-volatile memory 203 (to expand the capacity of the non-volatile memory 203).

The connection unit 208 (a second communication unit) is a communication interface. The connection unit 208 communicates with an external device through communication conforming to at least one of publicly-known wired and wireless communication standards, including a wireless communication standard. The connection unit 208 includes circuitry (antennas, connectors, transmitters/receivers, and the like) according to the communication standard to which the unit conforms.

The short-range wireless communication unit 212 (a first communication unit) is also a communication interface. The short-range wireless communication unit 212 communicates with external devices through communication conforming to one or more publicly-known short-range wireless communication standards. The short-range wireless communication unit 212 includes circuitry (antennas, transmitters/receivers, and the like) according to the communication standard to which the unit conforms.

As described above, it is assumed here that the connection unit 208 is a wireless communication interface which conforms to a wireless LAN (IEEE 802.11 series) standard. It is furthermore assumes that the short-range wireless communication unit 212 is a wireless communication interface which conforms to Bluetooth Low Energy (BLE).

A public network communication unit 209 is a communication interface for a mobile communication network, and conforms to one or more communication standards established by the Third Generation Partnership Project (3GPP), for example (3G, 4G, 5G, or the like).

Note that the connection unit 208, the short-range wireless communication unit 212, and the public network communication unit 209 may share some circuitry.

A microphone 210 is used for voice calls and to input voice commands. The microphone 210 is included in the operation unit 205 as a voice command input device.

A speaker 211 is used for voice calls, playing back audio, and the like.

FIG. 3B is a diagram illustrating an example of the external appearance of the smartphone 200. A power button 205*a*, a home button 205*b*, and a touch panel 205*c* are input devices included in the operation unit 205. When the home button 205*b* is pressed, the control unit 201 interrupts the execution of applications and displays a home screen in the display unit 206.

Items (e.g., icons) corresponding to applications are arranged in the home screen of the smartphone 200. From the home screen, applications can be launched and applications running in the background can be called to the foreground.

Here, an item 221 is an item for a camera communication application that provides a function which uses communication between the smartphone 200 and the digital camera 100. An item 222 is an image application item for viewing and editing images stored in the smartphone 200. An item 223 is an item for a social networking service (SNS) application that communicates with a server to share images, text, and the like with other users.

The present embodiment assumes that the camera communication application is provided by the manufacturer of the digital camera 100 and is installed through an app distribution site. The SNS application is assumed to be provided by a third party and installed through an app distribution site. On the other hand, the image application is assumed to be pre-installed as a standard app in the smartphone 200. It is assumed that whether individual applications are pre-installed or installed through an app distribution site is stored in the non-volatile memory 203, for example.

When an operation (e.g., touch operation) on an item is detected, the control unit 201 checks the state of the application corresponding to the operated item. If the application is not running or needs to be launched, the control unit 201 launches the application. On the other hand, if the application is running in the background (is inactive) and does not need to be launched, the control unit 201 moves the application to the foreground (the frontmost screen) (i.e., activates the application). This causes a screen of the application screen to be displayed in the display unit 206.

Aside from items being operated, the smartphone 200 can also change the state of the application through operations for switching applications performed according to the OS. Specifically, the application can be switched between being in the background (inactive) and in the foreground (active). If necessary, the control unit 201 launches the application switched from the background to the foreground. Note that the application may continue to perform some functions even after transitioning to the background (inactive).

Description of Menu Screen of Camera Communication Application in Smartphone 200

FIGS. 4A and 4B are diagrams illustrating examples of menu screens provided by the camera communication application when in the foreground. The camera communication application in the present embodiment is assumed to store information on digital cameras that have established connections with the smartphone 200 and provide a menu screen for each stored digital camera. If a plurality of digital cameras are stored, the user can switch the menu screen to display the menu screen of the desired digital camera to be used through the camera communication application.

Examples of screens displayed in the display unit 206 in response to the control unit 201 executing the camera communication application will be described hereinafter with reference to FIGS. 4A to 5C.

FIG. 4A illustrates an example of a menu screen 400 displayed when not even one digital camera is registered when the camera communication application is launched. The menu screen 400 has a register camera button 401 and a confirm registration button 402.

When the register camera button 401 is pressed, the control unit 201 executes a digital camera registration operation. When the registration is complete, the control unit 201 generates a menu screen for the registered digital camera and displays that screen in the display unit 206. Operations by the smartphone 200 and the digital camera 100 during digital camera registration will be described in detail later.

When the confirm registration button 402 is pressed, the control unit 201 displays a list of digital camera information registered in the camera communication application in the display unit 206.

FIG. 4B illustrates an example of a menu screen 400*a* displayed when a connection is currently established between an already-registered digital camera and the smartphone 200 when the camera communication application is launched. It is assumed here that a connection has already been established between the digital camera 100*a*, which is already registered in the camera communication application, and the smartphone 200. The menu screen 400*a* is therefore a menu screen for the digital camera 100*a*.

The menu screen 400*a* displays, for example, an icon 403*a* indicating the external appearance, a name 404*a* (Camera A), and a connection method 405*a* as the information on the connected digital camera 100*a*. Here, icons are listed for each method (communication standard name) by which the smartphone 200 and digital camera 100*a* can be connected, and if a connection is currently established, the icon is displayed brighter than if no connection is established. Note that another display method may be used, such as indicating only the method by which the connection is established. The example in FIG. 4B indicates that a BLE connection is currently established between the smartphone 200 and the digital camera 100*a*, but a Wi-Fi connection is not established.

In the present embodiment, information necessary to establish a connection by the connection units 208 and 108 (e.g., identification information, a password or encryption key, address information, or the like) can be obtained from the digital camera 100 through the connection made by the short-range wireless communication units 212 and 112. Switching the communication interface used for communication with the same external device between the short-range wireless communication unit 112 and the connection unit 108 will be called a "handover" here.

A wireless LAN connection is required for functions executed in response to function buttons 406a to 408a (described later) being pressed. However, handover to a wireless LAN connection is possible if a connection is already established over BLE. The function buttons 406a to 408a are therefore displayed as enabled functions in the menu screen 400a. If a handover is not possible, the function buttons 406a to 408a are displayed as disabled functions.

Function buttons 406a to 409a correspond to functions that the camera communication application can provide for the digital camera 100a. The functions described here are merely examples, and the type and number of functions can vary depending on the camera communication application and the digital camera.

Any functions may be applied as long as the functions are related to the already-registered digital camera, such as a function for changing the settings of the digital camera, a function for connecting to an external website where the instruction manual of the digital camera can be viewed, or the like, for example. The number and types of function buttons displayed in the menu screen may vary depending on the digital camera.

The function button 406a is a button for executing a function for obtaining an image recorded in the recording medium 107 from the digital camera 100a and displaying the image in the display unit 206.

The function button 407a is a button for obtaining a live view image from the digital camera 100a and using the display unit 206 as an EVF of the digital camera 100a.

The function button 408a is a button for setting an automatic transmission function that, when a still image is shot by the digital camera 100a, transfers generated image data for recording to the smartphone 200.

The function button 409a is a button for causing the smartphone 200 to function as a remote controller for issuing shooting instructions to the digital camera 100a. The remote controller function only outputs shooting instructions, and does not cause the display unit 206 to function as an EVF of the digital camera 100a.

It is assumed here that the functions corresponding to the function buttons 406a to 408a are registered in the camera communication application as functions that require communication over wireless LAN when executed. On the other hand, it is assumed that the function corresponding to the function button 409a is registered in the camera communication application as a function that does not require communication over wireless LAN when executed (i.e., can be executed through BLE communication). The relationship between the functions provided by the camera communication application and the communication method required at the time of execution are assumed to be determined in advance according to, for example, the amount of data communicated between the digital camera 100 and smartphone 200 when executing the function, the type of data, and the like. For example, a function that requires image data to be transmitted from the digital camera 100 to the smartphone 200 can be a function that requires a communication method, among the communication methods supported by the smartphone 200, that is capable of high-speed communication.

The camera communication application determines whether to enable or disable the function buttons according to the connection method between the smartphone 200 and the digital camera 100a, and varies the display formats of the function buttons in accordance with the determination.

FIG. 4B illustrates a state in which the digital camera 100a and smartphone 200 have established a connection using BLE, but not using wireless LAN. In this case, the control unit 201 determines that remote controller function, which does not require communication over the wireless LAN, is to be enabled. As a result, the function button 409a corresponding to the remote controller function is displayed in a format indicating the function is enabled. Here, function buttons corresponding to enabled functions are assumed to be displayed brighter than function buttons corresponding to disabled functions.

On the other hand, the functions corresponding to the function buttons 406a to 408a require communication over wireless LAN when executed and are therefore disabled under the current connection method. However, a wireless LAN connection can be established using the currently-established BLE connection, and thus the control unit 201 also displays the function buttons 406a to 408a in a format indicating that the buttons are enabled.

In the menu screen 400a, a page mark 410a has a number equal to the number of menu screens that can be switched. Only one digital camera is registered here, and thus one page mark 410a is displayed, which indicates that there is no other menu screen which can be switched to. For example, if there is another menu screen which can be switched to, two page marks 410a will be displayed, one of which is displayed in black. The page mark 410a displayed in black indicates the menu screen currently displayed. The position of the page mark displayed in black among the plurality of page marks 410a indicates the page number of the menu screen being displayed, and corresponds to an index number of the camera information described later.

The control unit 201 stores the page number of the menu screen currently displayed in the working memory 204. When the camera communication application transitions from the foreground to the background or is terminated, the control unit 201 stores the page number in the non-volatile memory 203. Through this, the next time the camera communication application is launched, the menu screen can be reproduced in the same state as the previous time.

FIG. 5A illustrates an example of a menu screen 400b displayed when the smartphone 200 has already established a wireless LAN connection with the digital camera 100b when the camera communication application is launched, in a state where the digital cameras 100a and 100b are already registered. Among the items displayed in the menu screen 400b, items having the same reference signs as in FIG. 4B are the same as those in the menu screen 400a, and will therefore not be described.

The menu screen 400b displays, for example, an icon 403b indicating the external appearance, a name 404b (Camera B), and a connection method 405b as the information on the connected digital camera 100b.

The digital camera 100b has never established a connection with the smartphone 200 using BLE, and thus BLE is not displayed in the connection method 405b. If a wireless LAN connection has been established, a disconnect button 411b is displayed.

When the disconnect button 411b is pressed, the control unit 201 transmits a disconnect request to the digital camera 100b to terminate the wireless LAN connection. Upon receiving the disconnect request, the control unit 101 of the digital camera 100b stops the operations of the connection unit 108. This results in the loss of the network generated by the connection unit 108 as a simple AP.

A wireless LAN connection is already established, and thus the control unit 201 determines that the functions corresponding to function buttons 406b to 408b are to be enabled and displays the function buttons 406b to 408b brighter. On the other hand, a BLE connection has not yet been established, and thus the control unit 201 determines that the remote controller function is to be disabled, and displays a function button 409*b* darker.

Two page marks 410*b* are displayed, one black and one white. This is because the two digital cameras 100*a* and 100*b* are registered and two pages of menu screens are generated. Of the two page marks 410*b*, the one on the left is displayed in black and the one on the right in white, which indicates that there is one page corresponding to another menu screen on the right side. Accordingly, if a leftward flick operation is detected on the display unit 206, for example, the control unit 201 switches to the menu screen 400*a*.

FIG. 5B illustrates a state of the menu screen 400*a* which has been updated in response to the control unit 201 detecting that the BLE connection with the digital camera 100*a* has been terminated in the state indicated by the menu screen 400*a* illustrated in FIG. 4B. The BLE connection may be intentionally terminated by the user through the operation unit 105 of the digital camera 100*a*, or may be terminated due to another factor, for example.

When the BLE connection is terminated, there are no longer any connections established with the digital camera 100*a*. As such, the control unit 201 updates the display of BLE in the connection method 405*a*, and the displays of the function buttons 406*a* to 409*a*, in the menu screen 400*a*. Specifically, the control unit 201 darkens the BLE display in the same manner as the Wi-Fi display. The control unit 201 also darkens the display of the function buttons 406*a* to 409*a* to indicate a disabled state.

FIG. 5C illustrates a state of the menu screen 400*b* which has been updated in response to the control unit 201 detecting that the wireless LAN connection with the digital camera 100*a* has been terminated in the state indicated by the menu screen 400*b* illustrated in FIG. 5A. The wireless LAN connection may be intentionally terminated by the user operating the disconnect button 411*b*, for example, or may be terminated due to another factor.

When the wireless LAN connection is terminated, there are no longer any connections established with the digital camera 100*b*. As such, the control unit 201 updates the display of Wi-Fi in the connection method 405*b*, and the displays of the function buttons 406*b* to 408*b*, in the menu screen 400*b*. Specifically, the control unit 201 darkens the display of Wi-Fi to indicate the disconnected state. The control unit 201 also darkens the display of the function buttons 406*b* to 408*b* to indicate a disabled state.

Example of Registered Camera Information

FIG. 6 is a diagram illustrating an example of the camera information obtained by the smartphone 200 from a digital camera with which a connection is established and stored in the non-volatile memory 203. To simplify the descriptions and facilitate understanding, FIG. 6 illustrates the camera information in table format, but the camera information may actually be stored in any format. The camera communication application handles digital cameras for which information is recorded in the non-volatile memory 203 as already-registered digital cameras.

The camera information includes an index 501, a name 502, and identification information 503 for each camera. Note that other information, such as information on the functions supported by the camera, for example, may be included.

The index 501 is a numerical value indicating an index (number) of the camera information, and a number is assigned in order from 1.

The name 502 is a character string indicating the name displayed in the menu screen. Note that the name is different from the model name, and is a nickname which can be set for the digital camera by the user.

The identification information 503 is unique information that differs for each individual digital camera. In the present embodiment, a character string indicating the MAC (media access control) address assigned to the connection unit 108 (the wireless LAN interface) is used as the identification information 503. Note that the identification information 503 may be other information, such as a serial number or the like, as long as it is information that is different for each individual digital camera.

The control unit 201 obtains the MAC address of the connection unit 108 and the name in the process of establishing a connection with the digital camera or using an established connection. The method, the timing, and the like for obtaining the camera information differs depending on the connection method (the communication standard).

The control unit 201 compares the identification information obtained from the digital camera 100 (the MAC address) with the identification information 503 in the camera information stored in the non-volatile memory 203. If the identification information obtained from the digital camera 100 is not registered as camera information, the control unit 201 determines that the digital camera 100 has been newly connected. The control unit 201 then adds the name and identification information of the digital camera 100 to the camera information stored in the non-volatile memory 203 along with a new index. In this manner, when a digital camera for which identification information is not stored is connected, the information of that camera is added to the camera information as a new digital camera.

On the other hand, if the identification information obtained from the digital camera 100 is already registered as camera information, the control unit 201 determines that an already-registered digital camera has been reconnected. In this case, the registered camera information need not be updated. However, the name setting for the digital camera 100 may have been changed, and thus the name in the already-registered camera information of the digital camera 100 may be updated.

Wireless LAN Connection Sequence

A sequence for establishing a wireless LAN connection between the digital camera 100 and the smartphone 200 will be described next with reference to FIGS. 7A and 7B.

Figure 7B:
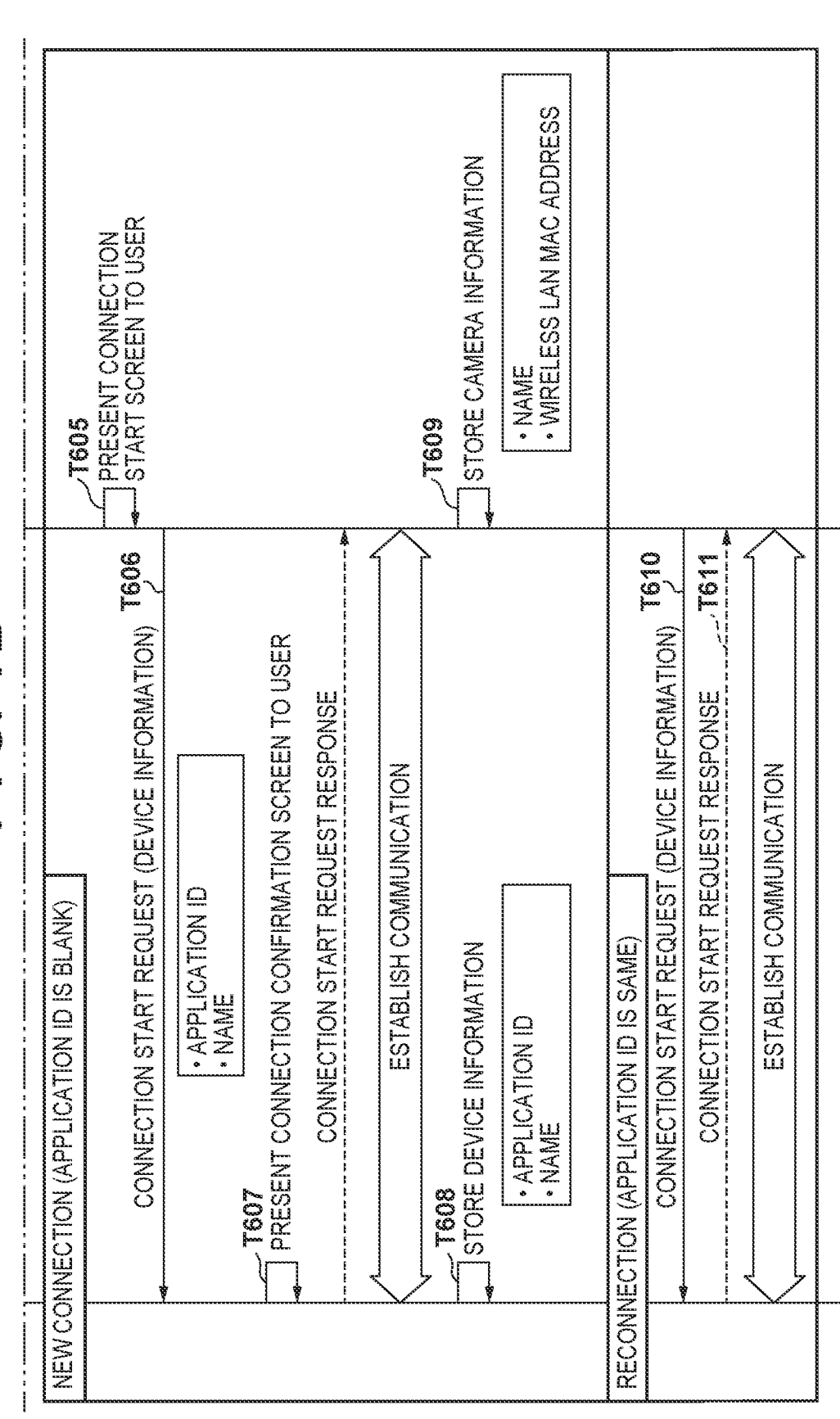

The sequence illustrated in FIGS. 7A and 7B is executed by both the digital camera 100 and the smartphone 200 with a function for connecting to an external device using wireless LAN being enabled (a state in which the connection units 108 and 208 are operational). The connection units 108 and 208 can be switched between being enabled and disabled through any publicly-known method, such as operating the menu screen of the digital camera 100, operating a settings application in the smartphone 200, or the like. It is also assumed that no BLE connection is established, and that a handover from BLE cannot be performed. Furthermore, it is assumed that the digital camera 100 and the smartphone 200 are within a distance at which wireless LAN communication is possible.

At T601, the control unit 101 starts the connection unit 108 to operate as a simple AP. Through this, the connection unit 108 periodically broadcasts a wireless LAN advertisement signal (a beacon frame) for communicating its own presence. It is assumed here that the wireless LAN advertisement signal includes at least an application ID, a name, and a wireless LAN MAC address as device information of the digital camera 100.

The application ID is an identifier for uniquely identifying a connection destination device. This ID is specified only when requesting reconnection to a specific device. For example, if the device has established a connection with the smartphone 200 in the past and is requesting reconnection to the smartphone 200, an application ID previously obtained from the smartphone 200 is specified. The application ID is specified only during reconnections, and is not specified when making a new connection (is blank without any value).

At T602, the control unit 201 of the smartphone 200 starts the connection unit 208, and starts processing for searching for a wireless LAN advertisement signal.

At T603, the control unit 201 receives, through the connection unit 208, the wireless LAN advertisement signal transmitted by the digital camera 100.

At T604, the control unit 201 analyzes the received wireless LAN advertisement signal and obtains the device information of the digital camera 100. The control unit 201 checks whether the application ID included in the device information is blank, determines that a new connection is being requested if the ID is blank, and executes T605. On the other hand, if the application ID is not blank, the control unit 201 checks whether the application ID matches the application ID of the smartphone 200. If the application IDs match, the control unit 201 determines that the digital camera 100 is requesting a reconnection to the smartphone 200, and executes T610. However, if the application IDs do not match, the control unit 201 determines that the request is a request to reconnect to another device. In this case, if no other advertisement signal is being received, the control unit 201 may terminate the operations by the connection unit 208.

Here, it is assumed that the application ID in the device information included in the advertisement signal is blank.

At T605, the control unit 201 displays, in the display unit 206, a screen inquiring with the user as to whether to start a connection using wireless LAN. The control unit 201 can display a screen including the name of the digital camera 100 from which the device information was obtained, as well as options such as "connect" and "cancel", for example.

For example, upon detecting an operation instructing a connection to be made, such as the "connect" button being pressed, the control unit 201 executes T606, whereas upon detecting an operation instructing a connection not to be made, such as the "cancel" button being pressed, the subsequent processing is not performed. In this case, the control unit 201 may skip executing T602, or may terminate the operations of the connection unit 208.

At T606, the control unit 201 transmits a connection start request from the connection unit 208 to the digital camera 100. The connection start request is assumed to include at least the application ID and the name as the device information of the smartphone 200.

The control unit 101 receives the connection start request from the smartphone 200 through the connection unit 108. The control unit 101 then checks whether the application ID included in the device information in the connection start request from the smartphone 200 is stored in a non-volatile memory 103. If the application ID in the received device information is not stored in the non-volatile memory 103, the control unit 101 determines that the connection start request is from a new device, and executes T607. On the other hand, if the application ID in the received device information is already stored in the non-volatile memory

103, the control unit 101 determines that the request is for reconnection, and executes T611. This corresponds to a case where a connection start request transmitted in T610 is received.

At T607, the control unit 101 displays, in the display unit 106, a screen inquiring with the user as to whether to start a connection using wireless LAN. The control unit 101 can display a screen including the name of the smartphone 200 from which the device information was obtained, as well as options such as "connect" and "cancel", for example.

Upon detecting an operation made on the screen, the control unit 101 transmits a response signal according to the result of the detection from the connection unit 108 to the smartphone 200. For example, upon detecting an operation instructing a connection to be made, such as the "connect" button being operated, the control unit 101 transmits a response signal permitting the connection. On the other hand, upon detecting an operation instructing a connection not to be made, such as the "cancel" button being operated, the control unit 101 transmits a response signal that does not permit the connection. It is assumed here that a response signal permitting the connection has been transmitted.

Upon receiving the response signal permitting the connection from the digital camera 100 through the connection unit 208, the control unit 201 executes processing for establishing a connection with the control unit 101. A wireless LAN connection is established between the digital camera 100 and the smartphone 200 as a result.

Once the wireless LAN connection is established, at T608, the control unit 101 stores the device information of the smartphone 200 (here, the application ID and the device name) in the non-volatile memory 103. The device information can be stored in the non-volatile memory 103 of the digital camera 100 in the same manner as the camera information indicated in FIG. 6.

At T609, the control unit 201 stores the device information of the digital camera 100 (here, the name and the wireless LAN MAC address) in the non-volatile memory 203 as the camera information.

In the case of a reconnection, at T610, the control unit 201 transmits a connection start request, in which the connecting application ID of the smartphone 200 is set in the device information, from the connection unit 208 to the digital camera 100. As described above, the control unit 101 determines that the connection start request is a reconnection request based on the connecting application ID.

When a reconnection request is received, the control unit 101 transmits a response signal permitting the connection at T611, without inquiring with the user as to whether to start the connection. The control units 201 and 101 then establish a connection in the same manner as when a new connection request is made. In the case of a reconnection, the control units 101 and 201 do not newly store the device information of their connection partners. Note that as described above, already-registered names may be updated as necessary.

Bluetooth Connection Sequence

A sequence for establishing a Bluetooth Low Energy (BLE) connection between the digital camera 100 and the smartphone 200 will be described next with reference to FIGS. 8A and 8B.

The sequence illustrated in FIGS. 8A and 8B is executed by both the digital camera 100 and the smartphone 200 with a function for connecting to an external device using BLE being enabled (a state in which the short-range wireless communication units 112 and 212 are operational). The short-range wireless communication units 112 and 212 can be switched between being enabled and disabled through any publicly-known method, such as operating the menu screen of the digital camera 100, operating a settings application in the smartphone 200, or the like. Furthermore, it is assumed that the digital camera 100 and the smartphone 200 are within a distance at which BLE communication is possible.

At T701, the control unit 101 causes the short-range wireless communication unit 112 to periodically broadcast a BLE advertisement signal for communicating its own presence to surrounding devices. It is assumed here that the BLE advertisement signal includes at least an application ID and the name as device information of the digital camera 100.

In the case of a new connection, the control unit 101 sets the application ID in the device information to blank, in the BLE advertisement signal as well. Additionally, in the case of a request to connect to a specific device, the control unit 101 sets an application ID corresponding to that device in the BLE advertisement signal.

At T702, the control unit 201 causes the short-range wireless communication unit 212 to start BLE advertisement signal search processing.

At T703, the control unit 201 receives, through the short-range wireless communication unit 212, the BLE advertisement signal transmitted by the digital camera 100.

At T704, the control unit 201 analyzes the received BLE advertisement signal and obtains the device information of the digital camera 100. The control unit 201 checks whether the application ID included in the device information is blank, determines that a new connection is being requested if the ID is blank, and executes T705. On the other hand, if the application ID is not blank, the control unit 201 checks whether the application ID matches the application ID of the smartphone 200. If the application IDs match, the control unit 201 determines that the digital camera 100 is requesting a reconnection to the smartphone 200, and executes T714. However, if the application IDs do not match, the control unit 201 determines that the request is a request to reconnect to another device. In this case, the control unit 201 can execute the search operations of T702.

Here, it is assumed that the application ID in the device information included in the advertisement signal is blank.

At T705, the control unit 201 displays, in the display unit 206, a screen inquiring with the user as to whether to start a connection using BLE. The control unit 201 can display a screen including the name of the digital camera 100 from which the device information was obtained, as well as options such as "connect" and "cancel", for example.

For example, upon detecting an operation instructing a connection to be made, such as the "connect" button being pressed, the control unit 201 executes T706, whereas upon detecting an operation instructing a connection not to be made, such as the "cancel" button being pressed, the subsequent processing is not performed. In this case, the control unit 201 can execute the search operations of T702.

At T706, the control unit 201 transmits a connection start request from the short-range wireless communication unit 212 to the digital camera 100. The connection start request is assumed to include at least the application ID as the device information of the smartphone 200.

The control unit 101 receives the connection start request from the smartphone 200 through the short-range wireless communication unit 112. The control unit 101 then checks whether the application ID included in the device information in the connection start request from the smartphone 200 is stored in a non-volatile memory 103. If the application ID in the received device information is not stored in the non-volatile memory 103, the control unit 101 determines that the connection start request is from a new device. On the other hand, if the application ID in the received device information is already stored in the non-volatile memory 103, the control unit 101 determines that the request is for reconnection. This corresponds to a case where a connection start request transmitted in T714 (described later) is received. The control unit 101 transmits a response signal from the short-range wireless communication unit 112 to the smartphone 200, whether the request is for a new connection or for a reconnection.

At T707, the control unit 201 receives the response signal from the digital camera 100 through the short-range wireless communication unit 212. The control unit 201 displays, in the display unit 106, a screen inquiring with the user as to whether to start pairing with the digital camera 100. The control unit 201 can display a screen including the name of the digital camera 100 from which the device information was obtained, as well as options such as "pair" and "cancel", for example.

For example, upon detecting an operation instructing pairing to be performed, such as the "pair" button being pressed, the control unit 201 executes T708, whereas upon detecting an operation instructing pairing not to be performed, such as the "cancel" button being pressed, the subsequent processing is not performed. In this case, the control unit 201 can execute the search processing of T702.

At T708, the control unit 201 and the control unit 101 generate encryption keys for encrypted communication. The short-range wireless communication units 112 and 212 then perform communication for exchanging the generated encryption keys. The control unit 201 stores the received encryption key in the non-volatile memory 203 in association with the identification information of the digital camera 100. Likewise, the control unit 101 stores the received encryption key in the non-volatile memory 103 in association with the identification information of the smartphone 200. The encryption key may be stored as part of the camera information indicated in FIG. 6. Encrypted communication (a BLE connection) is established between the digital camera 100 and the smartphone 200 as a result.

Once the BLE connection is established, at T709, the control unit 201 transmits a registration request including the device information of the smartphone 200 to the digital camera 100. The device information is assumed to include at least the application ID and the name of the smartphone 200.

Upon receiving the registration request from the smartphone 200 through the short-range wireless communication unit 112, at T710, the control unit 101 displays, in the display unit 106, a screen inquiring with the user as to whether to register the smartphone 200. The control unit 101 can display a screen including the name of the smartphone 200 from which the device information was obtained, as well as options such as "register" and "cancel", for example.

Upon detecting an operation made on the screen, the control unit 101 transmits a response signal according to the result of the detection from the short-range wireless communication unit 112 to the smartphone 200. For example, upon detecting an operation instructing registration to be performed, such as the "register" button being pressed, the control unit 101 transmits a response signal permitting the registration. On the other hand, upon detecting an operation instructing registration not to be performed, such as the "cancel" button being pressed, the control unit 101 transmits a response signal that does not permit the registration. It is assumed here that a response signal permitting the registration has been transmitted.

At T711, the control unit 101 stores the device information of the smartphone 200 included in the registration request received at T709 in the non-volatile memory 103.

At T712, the control unit 201 transmits a wireless LAN MAC address obtainment request signal to the digital camera 100 through the short-range wireless communication unit 212 in order to obtain the identification information of the digital camera 100.

The control unit 101 receives the wireless LAN MAC address obtainment request signal from the smartphone 200 through the short-range wireless communication unit 112. The control unit 101 generates a response signal including the wireless LAN MAC address of the connection unit 108 and transmits that signal from the short-range wireless communication unit 112 to the smartphone 200.

At T713, the control unit 201 obtains the wireless LAN MAC address of the digital camera 100 from the response signal received through the short-range wireless communication unit 212. Then, the wireless LAN MAC address and the name of the digital camera 100 obtained from the BLE advertisement signal at T703 are stored in the non-volatile memory 203 as new camera information. This completes the processing for pairing the smartphone 200 with the digital camera 100.

In the case of a reconnection, at T714, the control unit 201 transmits a connection start request, in which the connecting application ID of the smartphone 200 is set in the device information, from the short-range wireless communication unit 212 to the digital camera 100. As described above, the control unit 101 determines that the connection start request is a reconnection request based on the connecting application ID.

When a request for a reconnection is received, the control unit 101 reads out the encryption key of the smartphone 200 from the non-volatile memory 103. Likewise, the control unit 201 reads out the encryption key of the digital camera 100 from the non-volatile memory 203. The control units 101 and 201 then execute processing for establishing encrypted communication. Encrypted communication (a BLE connection) is established between the digital camera 100 and the smartphone 200 as a result.

Menu Screen Display Control

Menu screen display control operation in the camera communication application will be described next with reference to the flowcharts in FIGS. 9A and 9B. The camera communication application determines the menu screen to be displayed according to (i) whether the connection partner is a new device and (ii) the connection method.

It is assumed here that the smartphone 200 and the digital camera 100b are connected to the same wireless LAN network. Alternatively, the smartphone 200 may be connected to a network generated by the connection unit 108 of the digital camera 100b as a simple AP. The digital camera 100b and smartphone 200 may be connected to a network generated by a Wi-Fi router (not shown) serving as an AP.

Figure 9A:
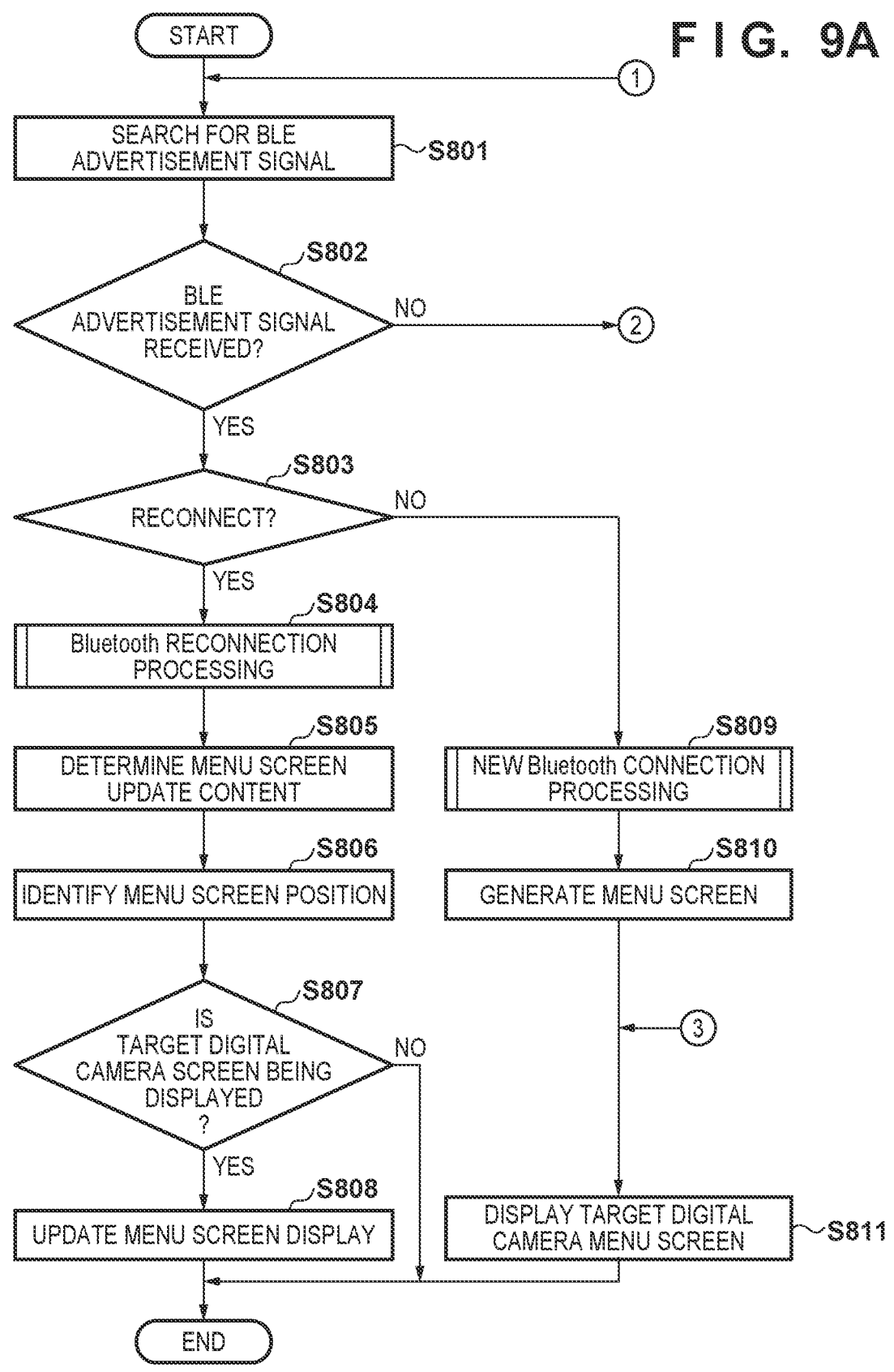
FIGS. 9A and 9B are flowcharts pertaining to screen display control operations by the smartphone according to embodiments.
Figure 9B:
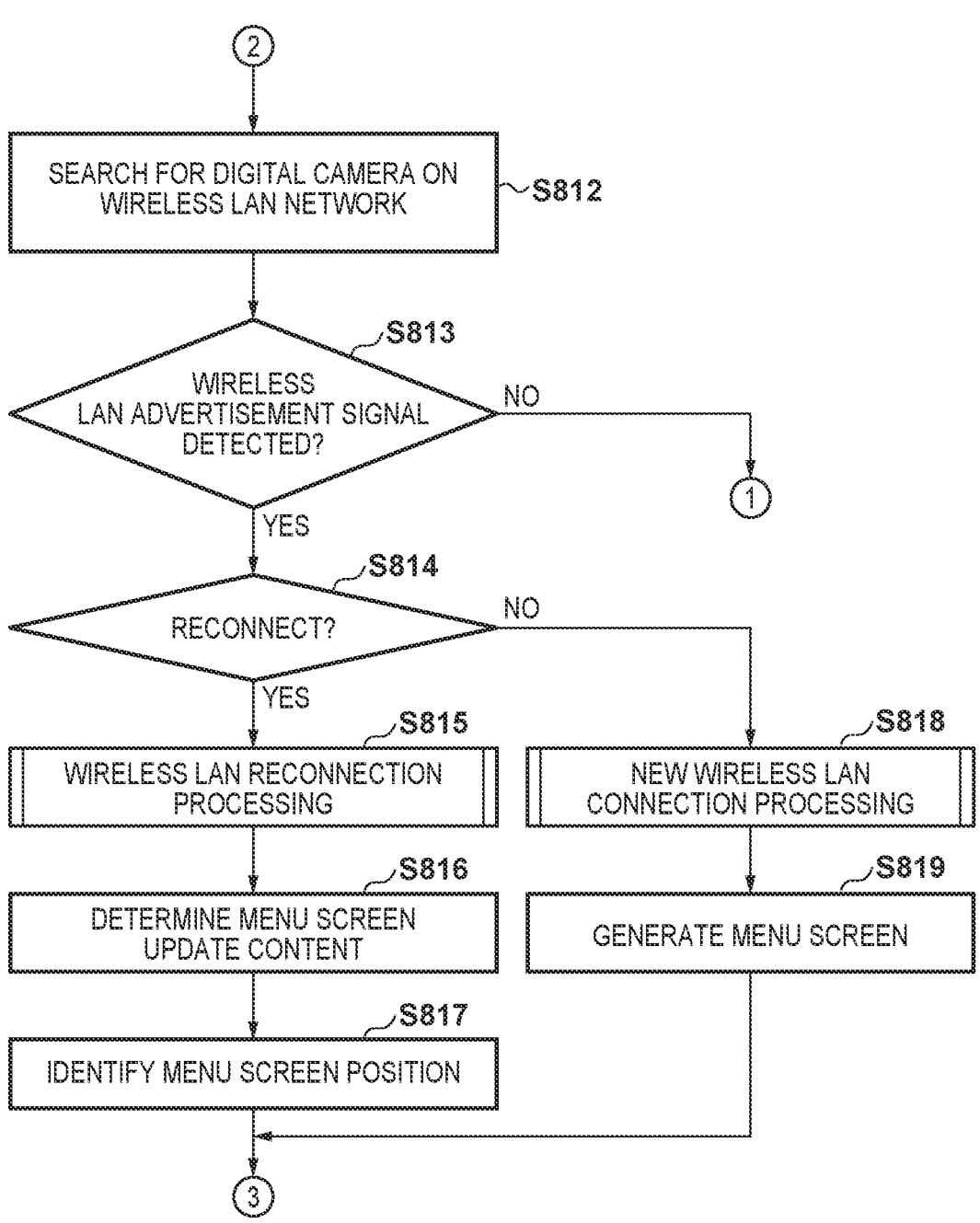

The operations illustrated in the flowcharts in FIGS. 9A and 9B are realized by the control unit 201 executing the camera communication application. The operations are also executed when a menu screen is displayed, such as when a camera communication application is launched in the smartphone 200. It is also assumed that the digital camera 100a and the digital camera 100b are connected to the smartphone 200 using BLE and wireless LAN, respectively.

In step S801, the control unit 201 causes the short-range wireless communication unit 212 to start BLE advertisement signal search processing.

In step S802, the control unit 201 determines whether a BLE advertisement signal has been received through the short-range wireless communication unit 212. The control unit 201 executes step S803 if it is determined that a BLE advertisement signal has been received, and executes step S812 if not.

In step S803, the control unit 201 obtains the application ID from the device information included in the received BLE advertisement signal. The control unit 201 then determines whether the obtained application ID matches the application ID of the smartphone 200 (e.g., the application ID transmitted at T709 in FIG. 8B).

If the two application IDs are determined to match, the control unit 201 determines that the request is for a reconnection from an already-registered device, and executes step S804. If the BLE advertisement signal does not include an application ID, the control unit 201 determines that the request is a new connection request, and executes step S809. If the BLE advertisement signal includes an application ID and that application ID is not determined to match the application ID of the smartphone 200, the control unit 201 determines that the advertisement signal is a connection request for another device, and executes step S812.

BLE Reconnection Processing

In step S804, the control unit 201 executes BLE reconnection processing with the digital camera 100a through the short-range wireless communication unit 212, and re-establishes a BLE connection. This reconnection processing is the same as the processing at T714 and on described with reference to FIG. 8B, and will therefore not be described here.

In step S805, the control unit 201 determines update content to reflect the reconnection in the menu screen. The display is not yet updated at this point. The control unit 201 determines to display the BLE icon for the connection method 405a brighter, to display the Wi-Fi icon darker, to display the function buttons 406a to 409a in the menu screen brighter.

In step S806, the control unit 201 identifies the page position of the menu screen 400a of the digital camera 100a reconnected in step S804. The page position of the menu screen 400a of the reconnected digital camera 100a matches the index 501 of the camera information of the digital camera 100a stored in the non-volatile memory 203.

The control unit 201 can therefore identify the page position of the menu screen 400a of the reconnected digital camera 100a by obtaining the index of the digital camera 100a from the camera information stored in the non-volatile memory 203. If necessary, the control unit 201 may obtain the identification information (the wireless LAN MAC address) from the digital camera 100a in step S806. Alternatively, the control unit 201 may use the name of the digital camera 100a included in the BLE advertisement signal received in step S802 to obtain the index of the digital camera 100a from the camera information.

The index obtained is used by the control unit 201 to determine, in step S807, whether the menu screen currently displayed in the display unit 206 of the smartphone 200 is the menu screen 400a of the reconnected digital camera 100a.

In step S807, the control unit 201 determines whether the menu screen currently displayed in the display unit 206 is the menu screen 400a of the digital camera 100a reconnected in step S804. The control unit 201 obtains the page position of the menu screen indicated by the page mark 410 from the working memory 204 and compares that page position with the index obtained in step S806. The page position of the menu screen corresponds to the index, and thus if both have the same value, the menu screen currently displayed in the display unit 206 can be determined to be the menu screen 400a of the digital camera 100a. On the other hand, if both have different values, the control unit 201 can determine that the menu screen currently displayed in the display unit 206 is not the menu screen 400a of the digital camera 100a.

The control unit 201 executes step S808 if the menu screen currently displayed in the display unit 206 is determined to be the menu screen 400a of the digital camera 100a reconnected in step S804, and terminates the processing illustrated in FIGS. 9A and 9B if not.

The menu screen 400a of the reconnected digital camera 100a is not displayed in the display unit 206 when, for example, a wireless LAN connection has already been established between the digital camera 100b and the smartphone 200. In this case, when the digital camera 100a reconnects to the smartphone 200 in step S804, the menu screen 400b of the digital camera 100b is displayed in the display unit 206 (the left side of FIG. 10A).

In this manner, in the present embodiment, while the menu screen of a device with which a connection is already established is being displayed, the display is not automatically switched to the menu screen of another device even if a connection is established with that other device. Accordingly, the menu screen 400b continues to be displayed, as illustrated on the right side of FIG. 10A.

In step S808, the control unit 201 updates the menu screen 400a displayed in the display unit 206 based on the details of the change determined in step S805. Specifically, when a BLE connection has been established, the BLE icon for the connection method 405a and the function buttons 406a to 409a are displayed brighter. The menu screen 400a is displayed in the form illustrated in FIG. 4B as a result of the update. However, the number of page marks 410a may vary depending on the number of indices in the registered camera information.

When a wireless LAN connection has been established with the digital camera 100a, the Wi-Fi icon for the connection method 405a and the function buttons 406a to 408a are displayed brighter. The BLE icon for the connection method 405a and the function button 409a are displayed darker. The menu screen 400a is displayed in the form illustrated in FIG. 5A as a result. In this case too, the number of page marks 410a may vary depending on the number of indices in the registered camera information.

The BLE standard has a function for automatically reconnecting already-paired devices when those devices are detected within communication range. Accordingly, if the digital camera 100a approaches the smartphone 200 while a wireless LAN connection is established between the digital camera 100b and the smartphone 200, the digital camera 100a is automatically reconnected. This automatic reconnection processing is performed by the control unit 201 regardless of whether the camera communication application is in the foreground or the background. In addition, the smartphone 200 can establish BLE connections with a plurality of digital cameras in parallel. In this manner, depending on the communication standard, automatic reconnection may be performed regardless of the user's intentions.

Accordingly, if, for example, the menu screen of the last device that established a connection is displayed, an unintended automatic reconnection will cause the menu screen to switch, interrupting the operations the user was performing for the other device. The present embodiment makes it possible to avoid the problem described above by not switching the menu screen if the menu screen of one device is being displayed when another device is reconnected, which provides good usability.

New BLE Connection Processing

Returning to FIGS. 9A and 9B, operations performed when the BLE advertisement signal does not include an application ID, i.e., when a new connection is made, will be described here.

In step S809, the control unit 201 executes new BLE connection processing with the digital camera 100a through the short-range wireless communication unit 212, and establishes a BLE connection. This new connection processing is the same as the processing described as T705 to T713 in FIGS. 8A and 8B, and will therefore not be described.

In step S810, the control unit 201 generates a menu screen for the newly-connected digital camera. Based on the camera information registered at T713 in FIG. 8B, the control unit 201 generates the menu screen illustrated in FIG. 4B for the digital camera 100a.

The control unit 201 reads out the name of the digital camera 100a from the camera information stored in the non-volatile memory 203 and sets the name 404a. The icon 403a indicating the external appearance of the digital camera 100a can be obtained from icons registered in the camera communication application in advance, according to a model name obtained from the digital camera 100a. The icon may be obtained by another method, however. With respect to the connection method 405a, the control unit 201 makes settings to display the BLE icon brighter because a BLE connection has been established in step S809, and display the Wi-Fi icon darker because no wireless LAN connection has been established.

Additionally, because a BLE connection has been established, the control unit 201 makes settings to display all the function buttons 406a to 409a brighter. Furthermore, the control unit 201 sets a maximum value of the index of camera information registered in the non-volatile memory 203 as the number of page marks 410a. The control unit 201 generates image data for the menu screen 400a based on the above-described settings.

In step S811, the control unit 201 displays the menu screen 400a generated in step S810 in the display unit 206. For example, if the digital camera that established the BLE connection in step S809 is the first digital camera registered in the smartphone, the menu screen switches from the menu screen 400 illustrated in FIG. 4A to the menu screen 400a illustrated in FIG. 4B.

Because new connections are not made automatically, it is conceivable that the user is making the connection intentionally. Accordingly, when a new device is connected, the display is switched to the menu screen for the newly-connected device.

After displaying the menu screen 400a in step S811, the control unit 201 terminates the processing illustrated in the flowcharts in FIGS. 9A and 9B.

Wireless LAN Connection

Operations in step S812 and on, which are performed when a BLE advertisement signal is not received in step S802, will be described next.

The digital camera 100b and the smartphone 200 are connected to the same wireless LAN network. The smartphone 200 can connect to a wireless LAN network by, for example, operating the settings application provided by the operating system. Likewise, the digital camera 100b can connect to a wireless LAN network through menu screen operations. It is assumed that information required for the connection, such as a password, is already known.

In step S812, through the connection unit 208, the control unit 201 searches for whether the digital camera 100b is present on the wireless LAN network to which a connection is currently established. If the wireless LAN function is enabled, the digital camera 100b transmits a wireless LAN advertisement signal from the connection unit 108 (T601 in FIG. 7A). The control unit 201 therefore causes the connection unit 208 to search for a wireless LAN advertisement signal.

The processing of searching for the digital camera 100b on the wireless LAN network can be performed when the camera communication application is in the foreground. Accordingly, if the camera communication application is moved to the background, the processing for searching is stopped.

In step S813, the control unit 201 determines whether a wireless LAN advertisement signal has been received through the connection unit 208. The control unit 201 executes step S814 if it is determined that a wireless LAN advertisement signal has been received, and executes step S801 if not.

In step S814, the control unit 201 checks whether the received wireless LAN advertisement signal includes an application ID. If the application ID is included, the control unit 201 determines a reconnection is being requested, and executes step S815. If the application ID is not included, the control unit 201 determines a new connection is being requested, and executes step S817.

Wireless LAN Reconnection

In step S815, the control unit 201 executes wireless LAN reconnection processing with the digital camera 100b. The wireless LAN reconnection processing is the same as the processing from T610 on in FIG. 7B, and will therefore not be described here.

When a wireless LAN connection is established between the digital camera 100b and the smartphone 200 in step S815, the control unit 201 executes step S816.

In step S816, the control unit 201 determines update content to reflect the reconnection in the menu screen, in the same manner as in step S805. The display is not yet updated at this point. The control unit 201 determines to display the BLE icon for the connection method 405b darker and the Wi-Fi icon brighter, and to display the function buttons 406b to 408b in the menu screen brighter and the function button 409b darker.

In step S817, the control unit 201 identifies the page position of the menu screen 400b of the digital camera 100b which has reconnected, in the same manner as in step S806. The page position of the menu screen 400b of the reconnected digital camera 100b matches the index 501 of the camera information of the digital camera 100b stored in the non-volatile memory 203.

Using the wireless LAN MAC address of the digital camera 100b included in the wireless LAN advertisement signal, the control unit 201 obtains the index 501 of the camera information of the digital camera 100b from the camera information stored in the non-volatile memory 203. For example, if the camera information illustrated in FIG. 6 is registered in the non-volatile memory 203, the index in the camera information of the digital camera 100b is "2". Alternatively, the index 501 of the camera information of the digital camera 100b may be used to obtain the name "Camera B" of the digital camera 100b included in the wireless LAN advertisement signal received in step S812.

The control unit 201 then generates image data of the menu screen 400b for the reconnected digital camera 100b, reflecting the determination made in step S816 and the index obtained in step S817.

In step S811, the control unit 201 displays the generated menu screen 400b in the display unit 206, and then terminates the processing illustrated in the flowcharts in FIGS. 9A and 9B.

For example, FIG. 10B illustrates the change in the menu display when a wireless LAN connection is re-established with the digital camera 100b while the menu screen 400a for the digital camera 100a, with which a connection has not been established, is displayed. Because a connection with the digital camera 100a has not been established, each item in the menu screen 400a is displayed darker (the left side of FIG. 10B). When the wireless LAN connection with the digital camera 100b is re-established in this state, the display switches to the menu screen 400b illustrated on the right side of FIG. 10B.

New Wireless LAN Connection

Operations performed when the wireless LAN advertisement signal does not include an application ID, i.e., when a new connection is made, will be described next.

In step S818, the control unit 201 executes new wireless LAN connection processing with the digital camera 100a through the connection unit 208, and establishes a wireless LAN connection. This new connection processing is the same as the processing described as T606 to T609 in FIGS. 7A and 7B, and will therefore not be described.

In step S819, the control unit 201 generates a menu screen for the newly-connected digital camera 100b. Based on the camera information registered at T609 in FIG. 7B, the control unit 201 generates the menu screen illustrated in FIG. 5A for the digital camera 100b.

The control unit 201 reads out the name of the digital camera 100b from the camera information stored in the non-volatile memory 203 and sets the name 404b. The icon 403b indicating the external appearance of the digital camera 100b can be obtained from icons registered in the camera communication application in advance, according to a model name obtained from the digital camera 100b. The icon may be obtained by another method, however. With respect to the connection method 405b, the control unit 201 makes settings to display the Wi-Fi icon brighter because a wireless LAN connection has been established in step S818, and display the BLE icon darker because no BLE connection has been established.

Additionally, because a BLE connection has not been established, the control unit 201 makes settings to display the function buttons 406b to 408b brighter and the function button 409b darker. Furthermore, the control unit 201 sets a maximum value of the index of camera information registered in the non-volatile memory 203 as the number of page marks 410b. The control unit 201 generates image data for the menu screen 400b based on the above-described settings. In the case of a new connection, the page position on the menu screen is last and therefore need not be identified.

The control unit 201 then executes step S811, and displays the generated menu screen 400b in the display unit 206, and then terminates the processing illustrated in the flowcharts in FIGS. 9A and 9B.

In this manner, in the case of a wireless LAN connection, the menu screen for the connected device is displayed when the connection is established, for both reconnections and new connections.

A connection over wireless LAN, which consumes more power than BLE, is typically only made when using functions that require wireless LAN communication, and is therefore considered to be a connection intended by the user. Accordingly, when a wireless LAN connection is established, automatically displaying the menu screen of the device connected to the wireless LAN makes it possible to execute functions using the connected device without having to manually switch menu screens.

According to the present embodiment, in a communication device capable of communicating with an external device using a plurality of connection methods, when an external device is connected, whether to automatically display a screen for the connected external device is determined according to the connection method and whether the connection is a new connection or a reconnection. Specifically, the screen for the connected external device is automatically displayed when there is a high possibility that the user has intentionally connected the external device, and the screen for the connected external device is not automatically displayed in other cases. This makes it possible to increase the convenience for the user.

OTHER EMBODIMENTS

In the foregoing embodiment, if, when a BLE connection is re-established, the menu screen of a device different from the BLE-connected device is being displayed, the menu screen is not switched. However, if communication has not been established with the device for which the menu screen is being displayed, the display may be automatically switched to the menu screen of the device with which the BLE connection has been re-established.

In addition, the foregoing embodiment described BLE and wireless LAN connections. However, the connection unit 208 may be a USB interface, and the external device may be connected to the smartphone by a USB cable (called a "USB connection"). The connection method may also be what is known as "tap-to-connect", which is a connection method that uses near-field communication (NFC) through the short-range wireless communication unit 212 for wireless LAN connections (called an "NFC connection").

Because the user establishes the connections by physically connecting or bringing the digital camera and the smartphone into close proximity, both of these methods are considered to be intentional connections. Therefore, when a USB connection or an NFC connection is established with an external device, the display can automatically switch to the menu screen for the external device.

FIG. 11 summarizes the display controls performed during new connections and during reconnections, for the BLE, wireless LAN, USB, and NFC connection methods.

If a wireless LAN connection is established while a USB connection is already established, or if a USB connection is established while a wireless LAN connection is already established, the display is not switched. Additionally, the embodiment assumed that in the wireless LAN connection processing, no other devices have established a wireless LAN connection. However, if another device has already established a wireless LAN connection, new wireless LAN connection requests may not be accepted. This is because functions using the already-established connection may be being executed between the external device and the smartphone.

Additionally, embodiment have been described in which the camera communication application as always being in the foreground. However, the camera communication application may be moved to the background. When the camera communication application is transitioning to the background, the control unit 201 does not execute connection processing even if an operation for making a USB connection or an NFC connection is detected. When the camera communication application returns to the foreground from the background, the control unit 201 can execute or resume the connection processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2022-156468, filed on Sep. 29, 2022, which is hereby incorporated by reference herein in its entirety.

What is claimed is:

1. A communication device capable of communicating with an external device using a first connection method and a second connection method, the communication device comprising:

a display device; and one or more processors that execute a program stored in a memory and thereby function as a control unit configured to determine, when a connection is established with an external device, whether to automatically display a screen for using the external device from the communication device based on (i) a connection method used to connect to the external device and (ii) whether the external device is newly connected or reconnected, wherein the control unit determines not to automatically display the screen for using the external device when the external device is reconnected while the communication device is connected with another external device and a screen for using the another external device is displayed.

2. The communication device according to claim 1, wherein the control unit determines not to automatically display the screen in a case where the connection method is the first connection method, the first connection method being capable of establishing connections with different external devices in parallel.

3. The communication device according to claim 2, wherein the control unit determines to automatically display the screen in a case where the connection method is the second connection method, the second connection method not being capable of establishing connections with different external devices in parallel.

4. The communication device according claim 1, wherein the control unit determines not to automatically display the screen in a case where the connection method is the first connection method, the first connection method automatically reconnecting to one external device in a state where the communication device is currently connected to another external device.

5. The communication device according to claim 1, wherein the control unit determines to automatically display the screen if there is no other external device currently connected to the communication device when a connection with the external device is established.

6. The communication device according to claim 1, wherein the control unit does not accept another connection request using the second connection method if a connection using the second connection method is currently established.

7. The communication device according to claim 1, wherein the second connection method is capable of faster communication and/or consumes more power than the first connection method.

8. The communication device according to claim 1, wherein the first connection method is a connection method which conforms to a Bluetooth standard, and the second connection method is a connection method which conforms to a wireless LAN standard.

9. The communication device according to claim 1, wherein the second connection method is a connection method which conforms to a USB standard, or a connection method which uses near-field communication to make a connection which conforms to a wireless LAN standard.

10. A control method for a communication device capable of communicating with an external device using a first connection method and a second connection method, the control method comprising:

detecting that a connection has been established with an external device; and determining whether to automatically display, in a display device, a screen for using the external device, for which a connection has been established, from the communication device, based on (i) a connection method used to connect to the external device and (ii) whether the external device is newly connected or reconnected, wherein the determining determines not to automatically display the screen for using the external device when the external device is reconnected while the communication device is connected with another external device and a screen for using the another external device is displayed.

11. A non-transitory computer-readable medium that stores a program which, when executed by a computer, causes the computer to perform a control method for a communication device capable of communicating with an external device using a first connection method and a second connection method, the control method comprising:

detecting that a connection has been established with an external device; and determining whether to automatically display, in a display device, a screen for using the external device, for which a connection has been established, from the communication device, based on (i) a connection method used to connect to the external device and (ii) whether the external device is newly connected or reconnected, wherein the determining determines not to automatically display the screen for using the external device when the external device is reconnected while the communication device is connected with another external device and a screen for using the another external device is displayed.

* * * * *